(12) United States Patent
Das et al.

(10) Patent No.: US 12,282,878 B2
(45) Date of Patent: Apr. 22, 2025

(54) METHOD AND SYSTEM FOR IDENTIFYING ACTIONS TO IMPROVE CUSTOMER EXPERIENCE

(71) Applicant: Genpact USA, Inc., New York, NY (US)

(72) Inventors: Dipanjan Das, Frisco, TX (US); Rana Saha, Conshohocken, PA (US); Kumar Priyadarshi, Irving, TX (US); Himanshu Shukla, Charlotte, NC (US); Prakash Hariharan, Bangalore (IN)

(73) Assignee: Genpact USA, Inc., New York, NY (US)

( * ) Notice: Subject to any disclaimer, the term of this patent is extended or adjusted under 35 U.S.C. 154(b) by 261 days.

(21) Appl. No.: 17/406,565

(22) Filed: Aug. 19, 2021

(65) Prior Publication Data

US 2023/0059500 A1    Feb. 23, 2023

(51) Int. Cl.
| | |
|---|---|
| G06Q 10/0639 | (2023.01) |
| G06Q 30/016 | (2023.01) |
| G06Q 30/0201 | (2023.01) |
| G06Q 30/0282 | (2023.01) |

(52) U.S. Cl.
CPC ..... *G06Q 10/06393* (2013.01); *G06Q 30/016* (2013.01); *G06Q 30/0201* (2013.01); *G06Q 30/0282* (2013.01)

(58) Field of Classification Search
None
See application file for complete search history.

(56) References Cited

U.S. PATENT DOCUMENTS

| | | | |
|---|---|---|---|
| 8,396,741 B2 | 3/2013 | Kannan et al. | |
| 10,102,491 B2 | 10/2018 | Connolly et al. | |
| 10,135,982 B2 | 11/2018 | Surridge et al. | |
| 10,628,771 B1 * | 4/2020 | Sicilia | G06Q 10/06393 |

(Continued)

FOREIGN PATENT DOCUMENTS

| | | |
|---|---|---|
| AU | 2016203835 B2 | 7/2017 |
| CA | 2787689 A1 | 2/2013 |

OTHER PUBLICATIONS

Mccoll-Kennedy, Janet R., et al. "Gaining Customer Experience Insights That Matter." Journal of Service Research, 2019, vol. 22(1) 8-26. (Year: 2019).*

(Continued)

*Primary Examiner* — Susanna M. Diaz
(74) *Attorney, Agent, or Firm* — Goodwin Procter LLP

(57) ABSTRACT

A method for automatically detecting and evaluating experience data associated with an experience journey to identify and adjust an action that is taken to improve customer experience is provided. In some embodiments, the method includes generating performance data associated with the experience journey from the experience data using a machine learning model. The method further includes determining the action to be taken based on analyzing the performance data. The method further includes collecting new experience data responsive to the action having been taken and training the machine learning model using the new experience data. The method further includes updating the performance data and the action to be taken based on training the machine learning model.

20 Claims, 18 Drawing Sheets

(56) References Cited

U.S. PATENT DOCUMENTS

| | | | | |
|---|---|---|---|---|
| 2003/0115302 | A1* | 6/2003 | Teraoaka | H04L 67/34 709/221 |
| 2005/0288981 | A1 | 12/2005 | Elias et al. | |
| 2011/0004483 | A1* | 1/2011 | Ting | G06Q 30/0201 707/E17.108 |
| 2011/0161857 | A1* | 6/2011 | Kramer | G06T 11/206 345/440 |
| 2013/0067351 | A1* | 3/2013 | Yokoi | G06Q 10/107 715/752 |
| 2013/0159054 | A1* | 6/2013 | Evans | G06Q 30/0204 705/7.31 |
| 2014/0114832 | A1* | 4/2014 | Escott | G06Q 40/04 705/37 |
| 2015/0066954 | A1* | 3/2015 | Jones | G06F 16/958 707/748 |
| 2017/0041270 | A1* | 2/2017 | Gubbala | H04L 51/02 |
| 2017/0046734 | A1* | 2/2017 | Chittilappilly | G06Q 30/0246 |
| 2017/0186018 | A1* | 6/2017 | Nandi | G06Q 30/016 |
| 2017/0201432 | A1* | 7/2017 | Balakrishnan | H04W 4/50 |
| 2018/0241881 | A1* | 8/2018 | Li | G06Q 10/10 |
| 2018/0350000 | A1* | 12/2018 | Asllan | G06Q 40/04 |
| 2019/0266621 | A1* | 8/2019 | Eckman | G06F 16/951 |
| 2020/0050527 | A1* | 2/2020 | Jones | G06F 17/18 |
| 2020/0151741 | A1* | 5/2020 | Paulsen | G06F 16/9038 |
| 2020/0272283 | A1* | 8/2020 | Sarin | G06F 3/167 |
| 2020/0336396 | A1* | 10/2020 | Su | H04L 43/065 |
| 2021/0150595 | A1* | 5/2021 | Pillai | G06Q 30/0282 |
| 2021/0157834 | A1* | 5/2021 | Sivasubramanian | G06F 16/686 |
| 2021/0397985 | A1* | 12/2021 | Sun | G06N 5/01 |
| 2022/0097228 | A1* | 3/2022 | Schaefer | G06V 30/414 |
| 2022/0309516 | A1* | 9/2022 | Rhoads | G06N 5/01 |
| 2023/0199515 | A1* | 6/2023 | Artuso | H04W 16/22 370/252 |

OTHER PUBLICATIONS

Lemon, et al., "Understanding customer experience throughout the customer journey," Journal of Marketing: AMA/MSI Special Issue, vol. 80, pp. 69-96, Nov. 2016.

\* cited by examiner

| Customer Name | Perfect Order Index Percentage | Email Experience Index Score | Perfect Order Index Scale >95% - 9 90 - 95% - 6 <90% - 3 | | Email Experience Index Scale >= 9 - 9 >= 8 - 6 < 8 - 3 | | Perfect Order Index Weightage | Email Experience Index | |
|---|---|---|---|---|---|---|---|---|---|
| | 1102 | 1104 | 1106 | | 1108 | | 1110 | 1112 | 1114 |
| Customer 1 | 98.6% | 9.2 | 9 | | 9 | | 0.75 | 0.25 | |
| Customer 2 | 89.0% | 7.8 | 3 | | 3 | | 0.75 | 0.25 | |
| Customer 3 | 92.0% | 8.1 | 6 | | 6 | | 0.75 | 0.25 | |
| Customer 4 | 78.0% | 9.4 | 3 | | 9 | | 0.75 | 0.25 | |
| Customer 5 | 99.0% | 6.2 | 9 | | 3 | | 0.75 | 0.25 | |

Figure 11

METHOD AND SYSTEM FOR IDENTIFYING ACTIONS TO IMPROVE CUSTOMER EXPERIENCE

TECHNICAL FIELD

This disclosure relates to a method and system for identifying an action to improve customer experience based on subjective and objective measurements.

BACKGROUND

Customer or user experience management traditionally includes conducting a customer survey either using communication channels such as phone or email or using survey-based measurement. The customer's voice in a survey may serve as a way to measure customer experience. However, approaches focusing only on customer feedback on operational performance do not take a data-driven approach to understand the customer experience, and thus have some shortcomings.

Traditional approaches have built-in unconscious bias. For example, customer responses are usually defaulted to a neutral value (e.g., 1-10), which reflects little or no information. Also, customer feedback is susceptible to sample bias, since surveys are not sent to all customers and satisfied or annoyed customers are more likely to respond to the surveys. The surveys also do not provide any quantifiable data and thus do not provide enough information for detailed analysis. Moreover, lack of knowledge of the resources that contribute to a certain quality of experience (e.g., comparable reviews for a same type of product or service) may also bias customer feedback. Most importantly, customers may experience a certain quality of experience but are not interested in providing feedback, and thus the survey response sample size is normally very small. Sometimes, a small amount of customer feedback is not measured due to low transaction volume.

Hence, there are gaps to fill in measuring customer experience. A new way for measuring the quality of customer experience and objectively understanding the customer experience is needed.

SUMMARY

To address the aforementioned shortcomings, a method and a system for identifying an action to improve customer experience is provided. The method generates performance data associated with the experience journey from the experience data using a machine learning model. The experience data includes customer feedback and objective interaction data. The performance data includes at least one of a key performance indicator (KPI) score, a customer experience (CX) index, a voice of customer (VOC) index, and an experience score. In some embodiments, the method includes automatically collecting the objective interaction data associated with each touchpoint of the experience journey; identifying a plurality of key performance indicators (KPIs) based on the objective interaction data; and building the machine learning model based on the customer feedback, the objective interaction data, and the plurality of KPIs. The method then determines the action to be taken based on analyzing the performance data. In some embodiments, the method includes identifying a focus area to be improved based on analyzing the performance data; identifying one or more actions that improve the focus area and one or more KPIs associated with the one or more actions; determining a KPI of priority from the one or more KPIs based on a set of criteria; and identifying, from the one or more actions, an action that corresponds to the identified KPI as the action to be taken. The method next collects new experience data and trains the machine learning model using the new experience data. The method updates the performance data and the action to be taken based on training the machine learning model.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

FIG. 11 is a procedure of computing a CX index based on normalized KPI scores, according to some embodiments.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

The present disclosure relates to improving customer experience through complexity and risk assessment of a customer, holistically measuring the customer experience that includes both subjective and objective measurement of the customer experience, and recommending a next best action (NBA) that would improve user experience as well as increasing revenue, working capital, and margin, etc.

Figure 1A:
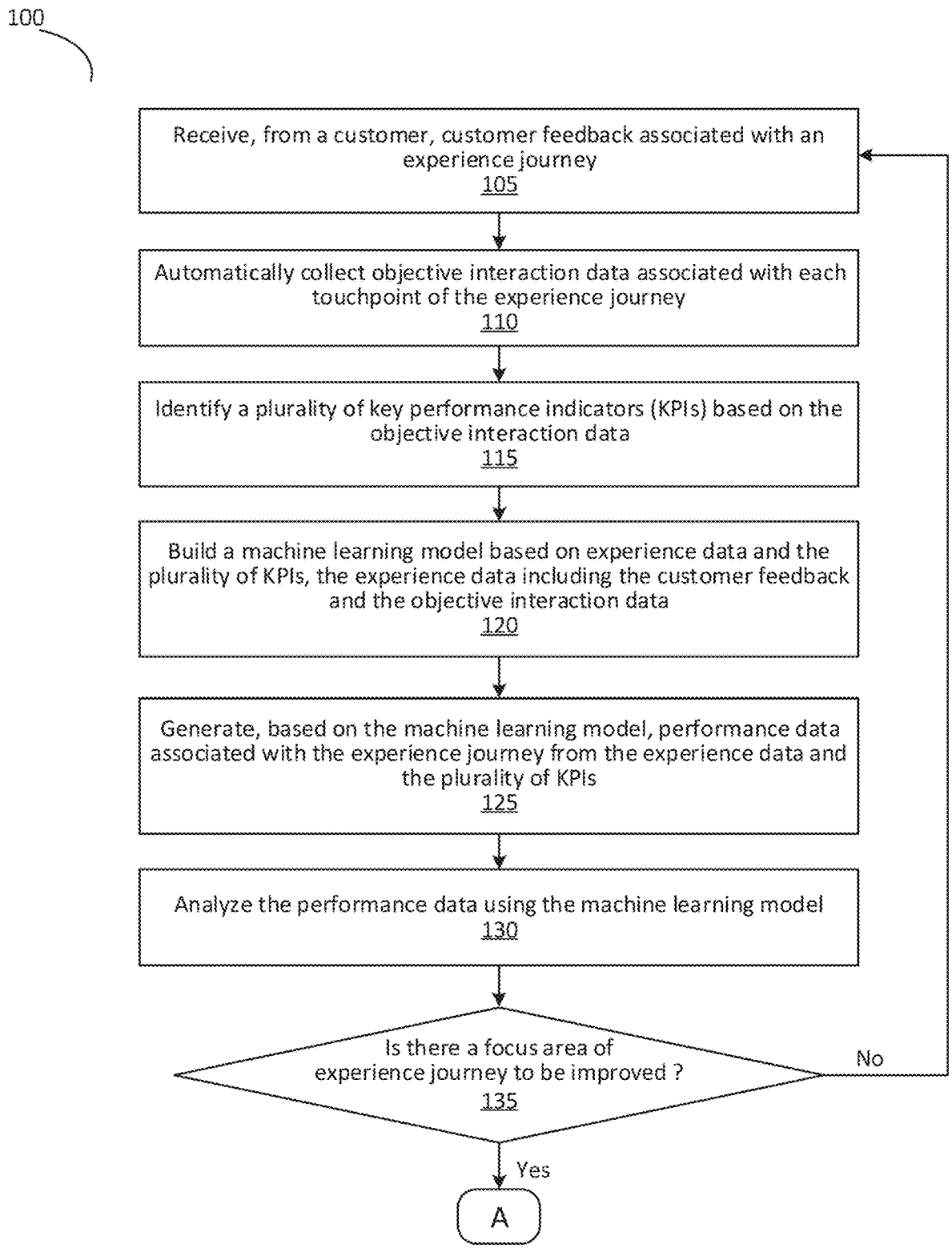
FIGS. 1A and 1B are flowcharts of a method for automatically detecting and evaluating experience data associated with an experience journey to identify an action used to improve customer experience, according to some embodiments.
Figure 1B:
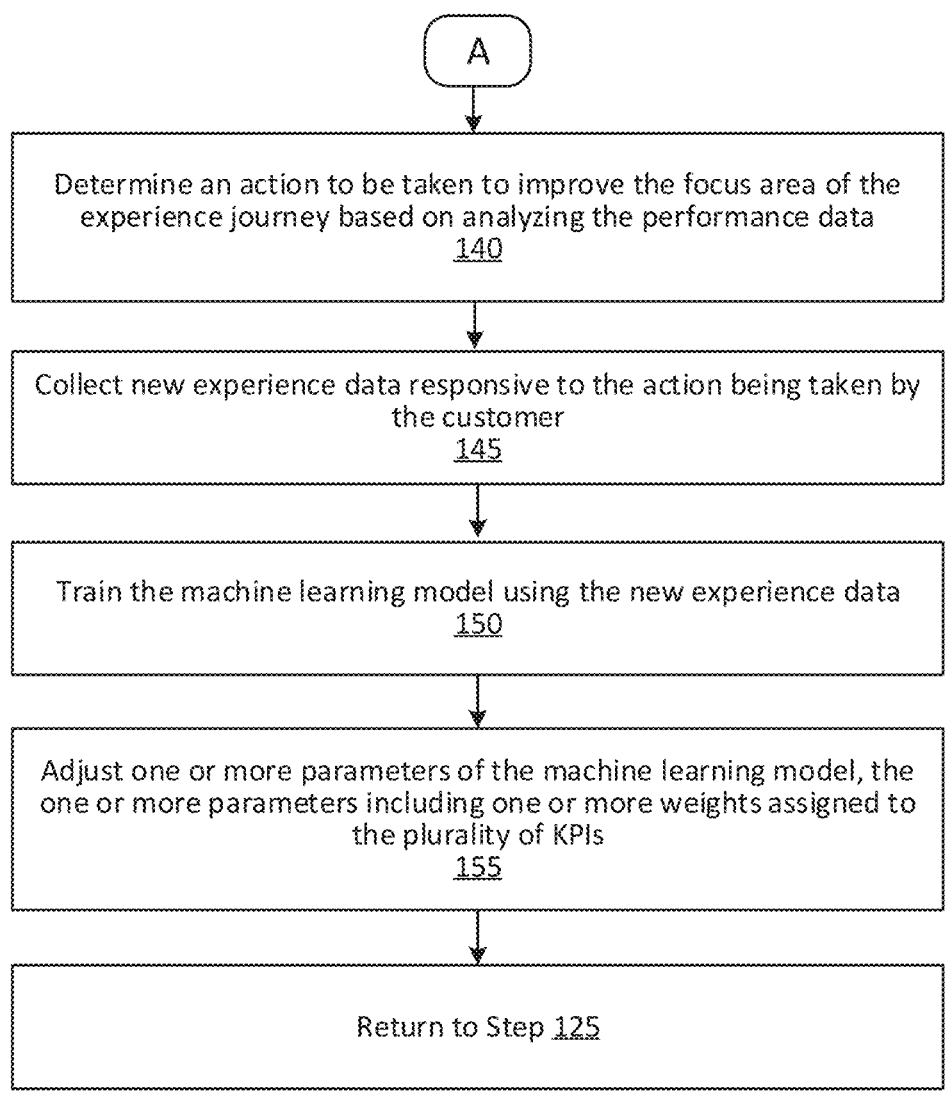

FIGS. 1A and 1B are flowcharts of method 100 for automatically detecting and evaluating experience data associated with an experience journey to identify an action used to improve customer experience. An experience journey or customer journey mapping is a visual representation of the steps that a customer follows when completing a specific task such as completing a sale, signing up for a product trial, or subscribing to a newsletter, etc. Experience data associated with the experience journey, in some embodiments, may include at least customer feedback (i.e., "subjective data") and interaction data with the experience journey (i.e., "objective data"). Operations of method 100 are performed based on the experience data to implement the functionalities described herein. In some embodiments, the operations of method 100 are executed using exemplary system architecture shown in FIGS. 2-4, and are further detailed with reference to FIGS. 5-16 described below.

As depicted in FIG. 1A, method 100 starts with operation 105 where customer feedback associated with an experience journey is received from a customer. A customer may provide the customer feedback, e.g., response to survey questions, through traditional communication channels such as phone, email or in-person. The customer feedback reflects the customer's subjective feeling (e.g., satisfaction) about the experience journey, and thus is also referred to as a measurement of VOC. At operation 110, method 100 continues with automatically collecting interaction data associated with each touchpoint of the experience journey. A touchpoint of the experience journey is the point that a customer interacts with an entity (e.g., a business entity, a brand) throughout the experience journey. The data collected in each touchpoint represents an occurred customer interaction and thus is objective. Compared to a customer feedback that is susceptible to biases (e.g., customer bias, sample size bias), the objective interaction data provides an alternative and accurate way to reflect the user experience in the experience journey. At operation 115, method 100 further proceeds with identifying a plurality of KPIs based on the interaction data. A KPI is a quantifiable measurement for gauging the effectiveness of the experience journey. The experience journey and KPIs will be described in more detail with reference to FIGS. 4-7.

Once the customer feedback, interaction data, and KPIs are collected and/or identified, an artificial intelligence (AI) model is built, trained, and refined to obtain customer journey insights and determine an action that improves the user experience based on the insights. In some embodiments, at operation 120, method 100 continues with building a machine learning model based on the experience data and the KPIs, where the experience data includes the customer feedback and the objective interaction data. The machine learning model may be a generic model using supervised learning algorithms (e.g., support vector machine (SVM) model) or unsupervised learning algorithms (e.g., k-means clustering model), or an advanced model using deep learning algorithms (e.g., convolution neural networks (CNN) model). Based on the machine learning model, at operation 125, method 100 continues with generating performance data associated with the experience journey from the experience data and the KPIs. The performance data provides the necessary statistics used to make management decisions about improvements, adjustments or modifications to the current experience journey. In some embodiments, the performance data may include, but is not limited to, a KPI score, a CX index, a VOC index, and an experience score. The generation of the performance data will be described in more detail with reference to FIGS. 4 and 8A-11.

Next, at operation 130, the performance data is analyzed using the machine learning model, and at operation 135, it is determined whether there is a focus area of the experience journey to be improved. A focus area may include a feature presenting troublesome or a step needing further development. If the focus area of the experience journey to be improved does not exist, method 100 returns back to operation 105 to continue receiving and processing the customer feedback. However, if the focus area of the experience journey to be improved exists, method 100 continues with determining an action to be taken to improve the focus area of the experience journey based on analyzing the performance data, as shown in operation 140 of FIG. 1B. For example, if a customer spends too much time on searching a product, an action to be taken to reduce the search time, i.e., a next best action, may be determined. The next best action may be selected based on one or more criteria from a set of candidate actions such as improving an application used for searching a product website, enhancing the product website, simplifying the representation of a search result, etc. The determination of an action to be taken based on the performance analysis will be described in more detail with reference to FIGS. 4 and 12A-13.

When an action to be taken is determined, a cycle for managing user experience throughout an experience journey is complete, and a new cycle starts as indicated in operations 145-155. The new cycle is to adjust the machine learning model and the action to be taken to improve the user experience through a learning process of the machine learning model. Referring to FIG. 1B, at operation 145, new experience data is collected responsive to the action being taken by the customer. The machine learning model is then trained using the new experience data at operation 150. Based on the training of the machine learning model, one or more parameters of the machine learning model are adjusted at operation 155. In some embodiments, the one or more parameters may include one or more weights assigned to the KPIs. Responsive to the machine learning model being newly tuned with the adjusted parameters, method 100 returns back to operation 125 to repeat operations 125-140 for generating the performance data and determining/adjusting an action to be taken to further improve the focus area of the experience journey. The update of the machine learning model and the corresponding action to be taken will be described in more detail with reference to FIGS. 4 and 14-16.

The present disclosure provides a technical solution for automatically detecting and evaluating experience data associated with an experience journey to identify and adjust an action to be taken to improve customer experience. Advantageously, the present disclosure expands the scope of subjective measurements (e.g., customer feedback) and establishes an objective way to measure the customer experience across the customer journey touchpoints. The objective measurements (e.g., interaction data) eliminate vulnerabilities of the subjective measurements with respect to, for example, sample size or customer selection (e.g., subjective measurements may be useless when the sample size is very small or when only certain customers are selected). Therefore, it is more efficient and effective to use objective measurements combined with subjective measurements to improve the user experience. The present disclosure also automates the data collection, which not only speeds up the data processing procedure but also reduces the errors in data processing. The present disclosure also provides recommendations of updated actions to a customer (based on machine learning) to improve a focus area of the experience journey, which prevents any other computer and network resources waste on manual action inquiries. In addition, by providing the updated action recommendations to continuously improve user experience, the present disclosure prevents customers from deviating to other systems to seek a better recommendation, thereby retaining the customers in the experience management system and increasing the productivity of the experience management system.

When optimizing the quality of user experience, the present disclosure may identify an issue based on experience data associated with an experience journey, and more specifically, drill down hierarchies of the data to identify a cause of the issue and an action used for solving the issue. The present disclosure described herein uses a specific technique, i.e., detecting and collecting data and signals transmitted from various sources and through different components/devices/modules (in FIGS. 2-4), and integrating and analyzing the data and signals to solve a technical problem arising in computer networks: identifying an issue and an action to solve the issue in experience management environment. The issue may be computer or network issues such as automating email processing over the network. Therefore, the present disclosure focuses on the specific improvement in computer capabilities, that is, automatically detecting and acting upon network and/or computer issues in experience management environment.

Figure 2:
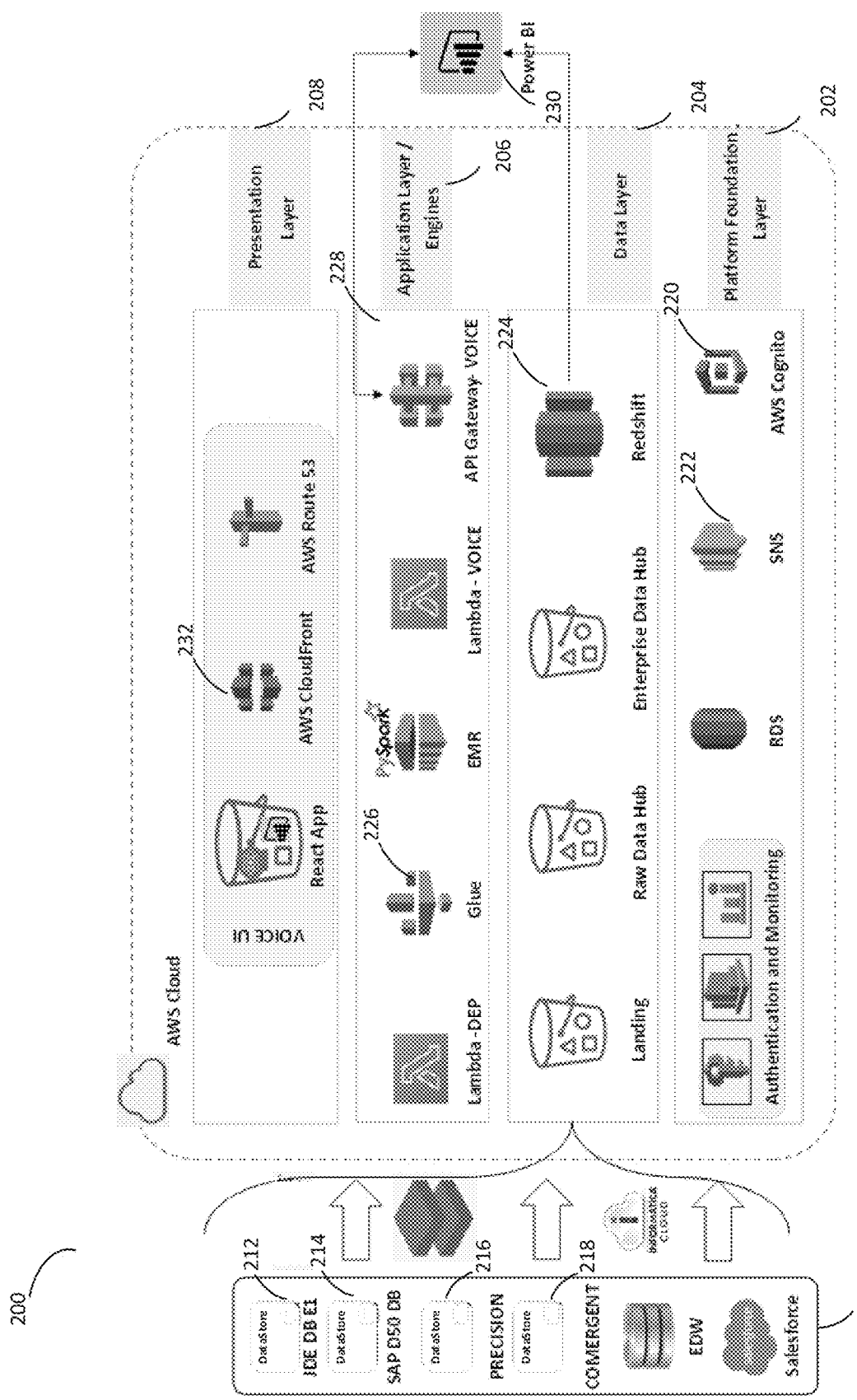
FIG. 2 is a network architecture deployed for evaluating experience data associated with an experience journey and identifying an action to improve customer experience using the methods described herein, according to some embodiments.

FIG. 2 is a network architecture 200 deployed for evaluating experience data associated with an experience journey and identifying an action to improve customer experience using the methods described herein, according to some embodiments. Network architecture 200 provides software, hardware, protocols, and media for implementing methods as described in the present disclosure. Network architecture 200 uses a layer model to characterize the message/signal transmissions between layers and the implementation of customer experience measurement functions by each layer. In some embodiments, architecture 200 includes a platform foundation layer 202, a data layer 204, an application layer/engines 206, and a presentation layer 208. In some embodiments, architecture 200 is based on Amazon™ web service (AWS) cloud.

In platform foundation layer 202, authentication and monitoring functions are performed. For example, platform foundation layer 202 may include AWS Cognito 220 to provide authentication, authorization, and user management for customers. Platform foundation layer 202 may also include simple notification service (SNS) 222 to provide message delivery from the system to customers. Platform foundation layer 202 may send to and receive data from other layers such as data layer 204. Data layer 204 collects data from multiple sources and organizes the data for distribution and sharing through data hubs and warehouse such as Amazon Redshift 224. In some embodiments, data layer 204 may also be coupled to other datastores to exchange and process rich data from various sources. For example, data layer 204 may connect to datastores 210 including JDE enterprise DB 212, SAP DSO 214, PRECISION 216, COMERGENT 218, data warehouse (EDW), etc.

Application layer/engine 206 is on top of data layer 204, which provides tools to receive, integrate, and process data. For example, an AWS Glue 226 in application layer/engine 206 can discover, prepare, and combine data for analytics such as machine learning and application development. Further, an API Gateway Voice 228 may be used to receive data related to customer experience (e.g., customer feedback) from a customer. The received data is transmitted from API Gateway Voice 228 to power BI 230. Power BI 230 is an intelligent data visualization tool for converting the received data into interactive dashboards and analysis reports in a simple interface. Once the data is converted, Power BI 230 may transmit the data to datastore such as Redshift 224 for storage. Other components of network architecture 200 may retrieve the customer experience data stored on the datastore for further processing. Above application layer/engine 206 is presentation layer 208. Presentation layer 208 is responsible for interfacing with customers. For example, using the web service of AWS CloudFront 232, dynamic content can be presented to a customer.

Figure 3:
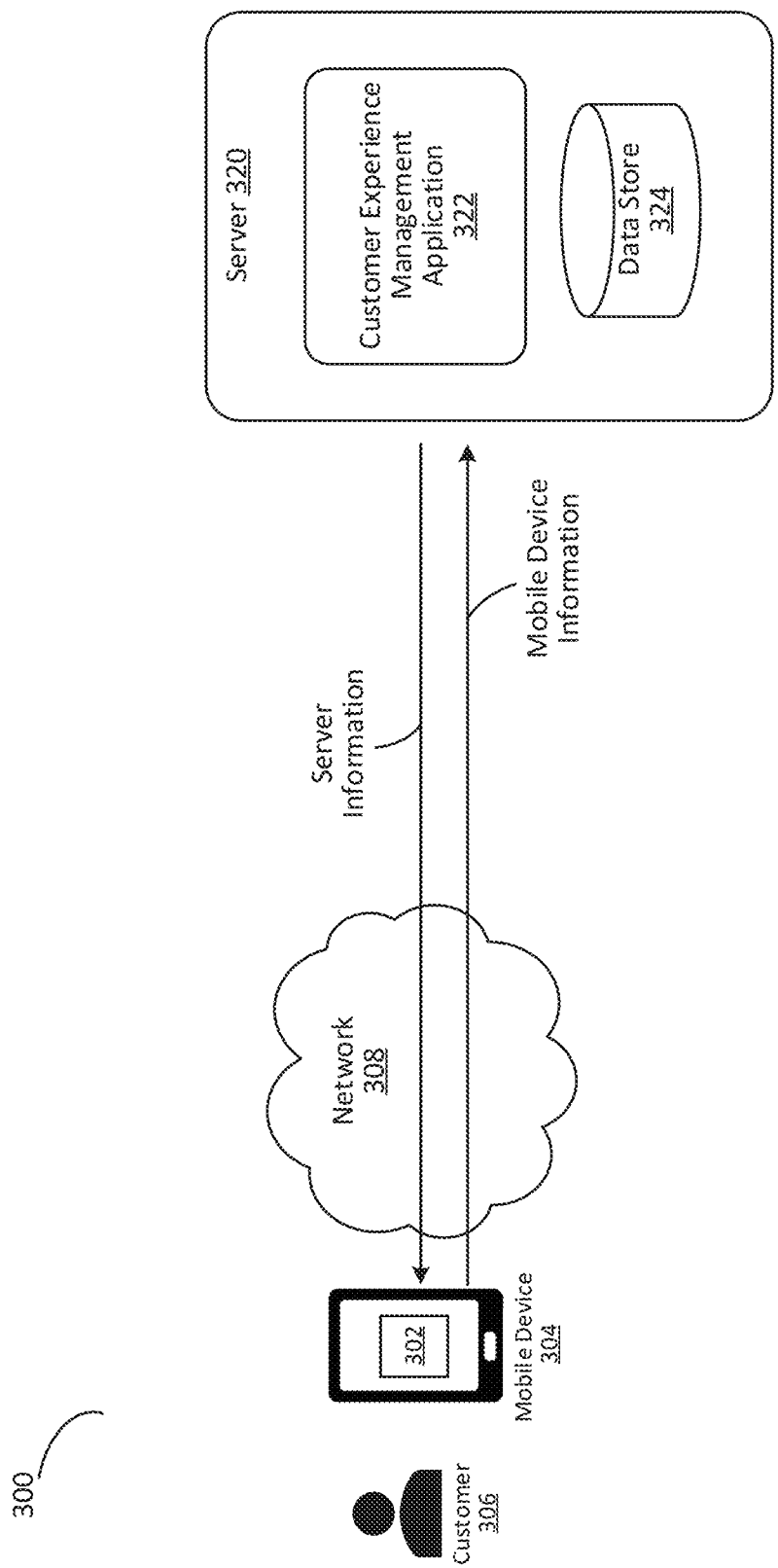
FIG. 3 is a system for evaluating experience data associated with an experience journey and identifying an action to improve customer experience, according to some embodiments.

FIG. 3 is a system 300 for evaluating experience data associated with an experience journey and identifying an action to improve customer experience, according to some embodiments. By way of example and not limitation, the methods described herein (e.g., method 100 in FIG. 1) may be executed, at least in part, by a software application 302 running on mobile device 304 operated by a user or customer 306. By way of example and not limitation, mobile device 304 can be a smart phone device, a tablet, a tablet personal computer (PC), or a laptop PC. In some embodiments, mobile device 304 can be any suitable electronic device connected to a network 308 via a wired or wireless connection and capable of running software applications like software application 302. In some embodiments, mobile device 304 can be a desktop PC running software application 302. In some embodiments, software application 302 can be installed on mobile device 304 or be a web-based application running on mobile device 304. By way of example and not limitation, user 306 can be a customer having an experience journey, a customer providing feedback about the experience journey, or a person who is working remotely and has access to software application 302 via mobile device 304.

Network 308 can be an intranet network, an extranet network, a public network, or combinations thereof used by software application 302 to exchange information with one or more remote or local servers, such as server 320. According to some embodiments, software application 302 can be configured to exchange information, via network 308, with additional servers that belong to system 300 or other systems similar to system 300 not shown in FIG. 3 for simplicity.

In some embodiments, server 320 is configured to store, process and analyze the information received from user 306, via software application 302, and subsequently transmit in real time processed data back to software application 302. Server 320 can include a customer experience management application 322 and a data store 324, which each includes a number of modules and components discussed below with reference to FIG. 4. According to some embodiments, server 320 performs at least some of the operations discussed in the methods described herein (e.g., method 100 in FIG. 1). In some embodiments, server 320 can be a cloud-based server.

Figure 4:
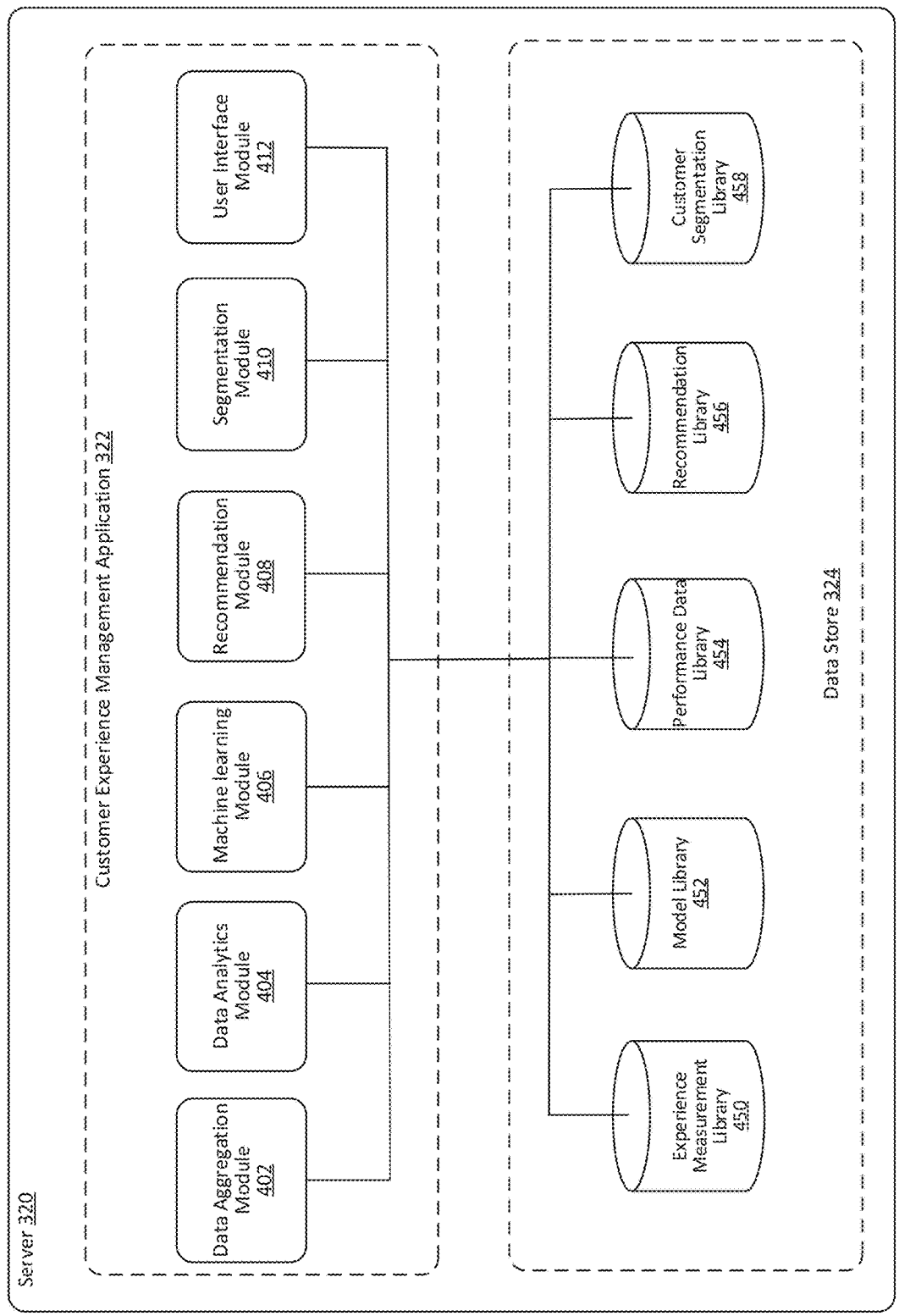
FIG. 4 is a server used as part of a system for evaluating experience data associated with an experience journey and identifying an action to improve customer experience using the methods described herein, according to some embodiments.

In some embodiments, FIG. 4 depicts selective components of server 320 used to perform the functionalities described herein, for example, operations of method 100. Server 320 may include additional components not shown in FIG. 4. These additional components are omitted merely for simplicity. These additional components may include, but are not limited to, computer processing units (CPUs), graphical processing units (GPUs), memory banks, graphic adaptors, external ports and connections, peripherals, power supplies, etc., required for the operation of server 320. The aforementioned additional components, and other components, required for the operation of server 320 are within the spirit and the scope of this disclosure.

In the illustrated embodiment of FIG. 4, server 320 includes a customer experience management application 322 and a data store 324. Customer experience management application 322 in turn includes one or more modules responsible for processing and analyzing the information received by server 320. For example, the modules in customer experience management application 322 may have access to the experience data received from customer 306 via software application 302 residing on mobile device 304.

In some embodiments, customer experience management application 322 of server 320 includes a data aggregation module 402, a data analytics module 404, a machine learning module 406, a recommendation module 408, a segmentation module 410, and a user interface module 412. In some embodiments, customer experience management application 322 of server 320 may include only a subset of the aforementioned models or include at least one of the aforementioned models. Additional models may be present on other servers communicatively coupled to server 320. For example, customer experience management application 322 of server 320 may only include data aggregation module 402, data analytics module 404, and user interface module 412, with machine learning module 406, recommendation module 408, and segmentation module 410 being on another server communicatively coupled to server 320. AR possible permutations and combinations, including the ones described above, are within the spirit and the scope of this disclosure. In some embodiments, customer experience management application 322 is implemented by at least some components shown in FIG. 2, such as AMS Glue 226, API Gateway VOICE 228, Power BI 230.

In some embodiments, data store 324 includes an experience measurement library 450, a model library 452, a performance data library 454, a recommendation library 456, and a customer segmentation library 458. Each library stores one or more types of data used in implementing the methods described herein. By way of example and not limitation, each library can be a hard disk drive (HDD), a solid state drive (SSD), a memory bank, or another suitable storage medium to which other components of server 320 have read and write access. In some embodiments, data store 324 may be one or more of data stores shown in FIG. 2.

Data aggregation module 402 detects and obtains experience data and KPIs associated with an experience journey. In some embodiments, data aggregation module 402 may first collect information related to a customer (e.g., customer 306) and create the experience journey for customer 306. Data aggregation module 402 may gather customer data by aggregating customer's structured and unstructured data from various databases (e.g., in-store, over the web, via social media, phone) across various geographics and product/service lines. For example, data aggregation module 402 may aggregate the customer data based on synchronizing the data to remove duplicity and discrepancies. Data aggregation module 402 may access different databases depending on different user roles (e.g., operation leader, administrative manager) and obtain different customer data.

Figure 5:
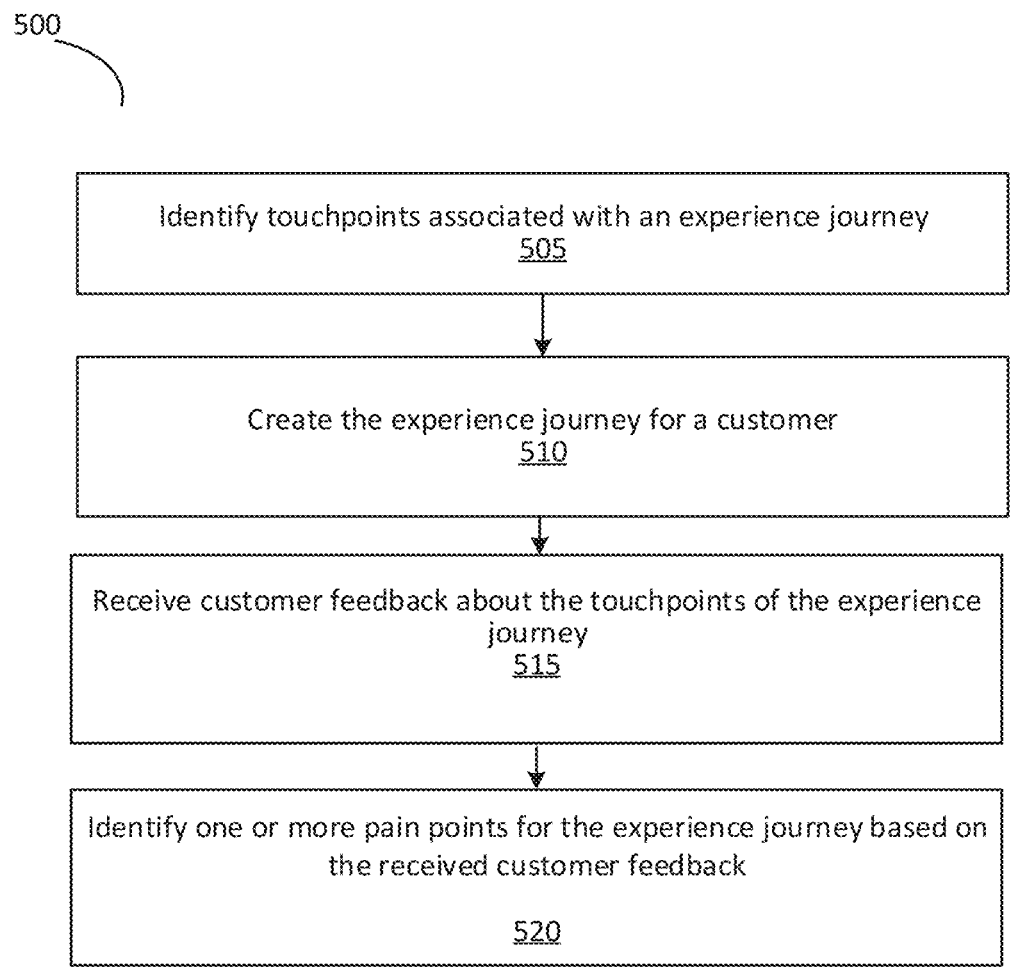
FIG. 5 is a flowchart of a method for building a customer experience journey mapping, according to some embodiments.
Figure 6:
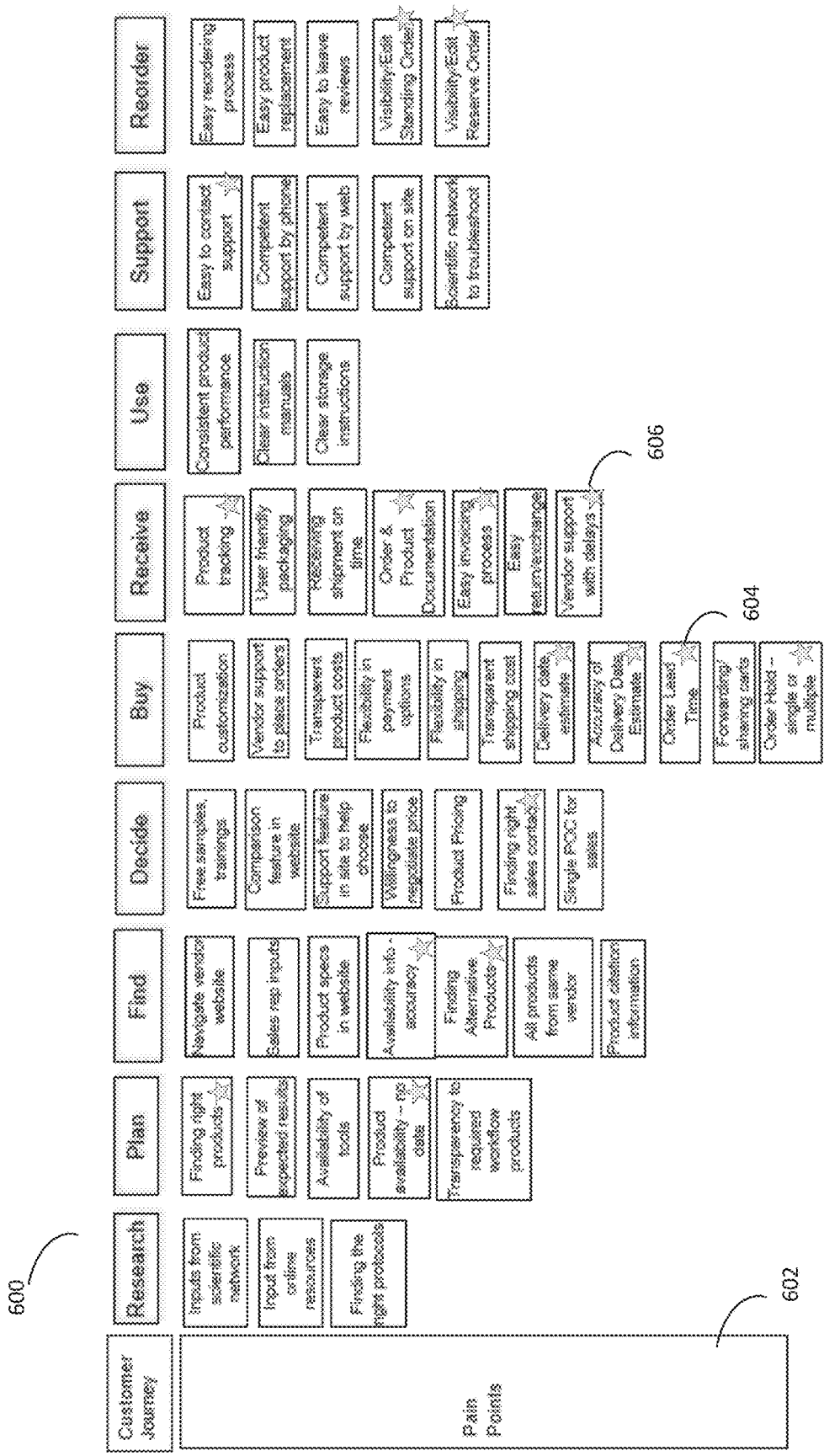
FIG. 6 is an example experience journey, according to some embodiments.

Based on the customer data, data aggregation module 402 may gather and understand customer intent. Thus, when customer 306 needs to complete a specific task, e.g., purchasing a product or service, data aggregation module 402 is able to identify a solution for that need. In other words, instead of letting customer 306 start a journey (e.g., by finding a website to buy a product), data aggregation module 402 may create an experience journey to satisfy the need of customer 306 in advance. The experience journey or customer journey mapping is a visual representation of the steps that a customer follows when completing the specific task. FIG. 5 is a flowchart of method 500 for building a customer experience journey mapping. At operation 505, data aggregation module 402 identifies touchpoints associated with the experience journey. A touchpoint is the place where customer interactions occur. Through the touchpoints of the experience journey, data aggregation module 402 tracks a lifecycle of the overall customer relationship, from awareness and acquisition to delivery and service. At operation 510, data aggregation module 402 creates the experience journey for customer 306 based on the identified touchpoints. FIG. 6 is an example experience journey 600. Journey 600 starts with the first touchpoint of "Research" when customer 306 begins to explore a buying task. Journey 600 continues with other touchpoints including "Plan," "Find," "Decide," "Buy," "Receive," "Use," "Support," and "Reorder," which cover the entire lifecycle of customer's experience in completing this buying task. At different touchpoints, customer 306 may identify a product in the marketplace, make a buying decision based on budget and timeline, make payment to buy the product, receive and use the product, contact support regarding the delivery and the use of the product, rearrange the product, etc. Depending on a type of customer and/or industry, data aggregation module 402 may change the journey steps or touchpoints. For example, data aggregation module 402 may add a step of renewing licenses for a software company customer but not for other types of customers. In some embodiments, data aggregation module 402 stores the data associated with the touchpoints and the experience journey in experience measurement library 450.

Once the experience journey is created, data aggregation module 402 detects and obtains experience data associated with each touchpoint of the experience journey. In some embodiments, the experience data includes at least customer feedback data and interaction data associated with the touchpoints of the experience journey. The customer feedback data may be user responses to different types of surveys about the experience journey. A customer usually presents subjective opinions in the customer feedback. The interaction data corresponds to the actual interactions of the customer occurred in each touchpoint of the experience journey. For example, the interaction data may include processing time, shipment information, return information or other data related to an order. In some embodiments, data aggregation module 402 is configured to have access to certain experience data (e.g., based on user roles) and automatically monitor and collect the experience data. Data aggregation module 402 may store the experience data in experience measurement library 450, and/or transmit the experience data to data analytics module 404 and machine learning module 406 for further processing.

Referring now to FIG. 5, data aggregation module 402 receives customer feedback about the touchpoints of the experience journey at operation 515, and identifies one or more pain points for the experience journey based on the received customer feedback at operation 520. A pain point is the frustration point of a customer in the experience journey. In some embodiments, data aggregation module 402 may identify pain points based on the customer feedback across the customer journey touchpoints. As shown in FIG. 6, pain points 602 are listed for each journey touchpoint in the example experience journey 600. Some paint points (e.g., 604, 606) are also highlighted with star labels to indicate they need immediate attention. Data aggregation module 402 may identify star-labelled pain points based on intensity of the pain points, where the intensity is measured based at least in part on a VOC score (as described below) and text analytics on the raw comments provided by the customer in the customer feedback. Since the pain points can be detrimental to user experience when left unattended, the pain points may be used by machine learning module 406 and recommendation module 408 (described below) to determine a focus area to be improved and an action to be taken to improve the focus area. In some embodiments, data aggregation module 402 stores the data describing pain points in experience measurement library 450.

Referring back to FIG. 4, once the experience data (e.g., customer feedback and interaction data) and pain points are obtained, data analytics module 404 may analyze the obtained data to generate performance data. The performance data determines whether a customer is satisfied with the performance at each touchpoint of the experience journey.

Figure 7:
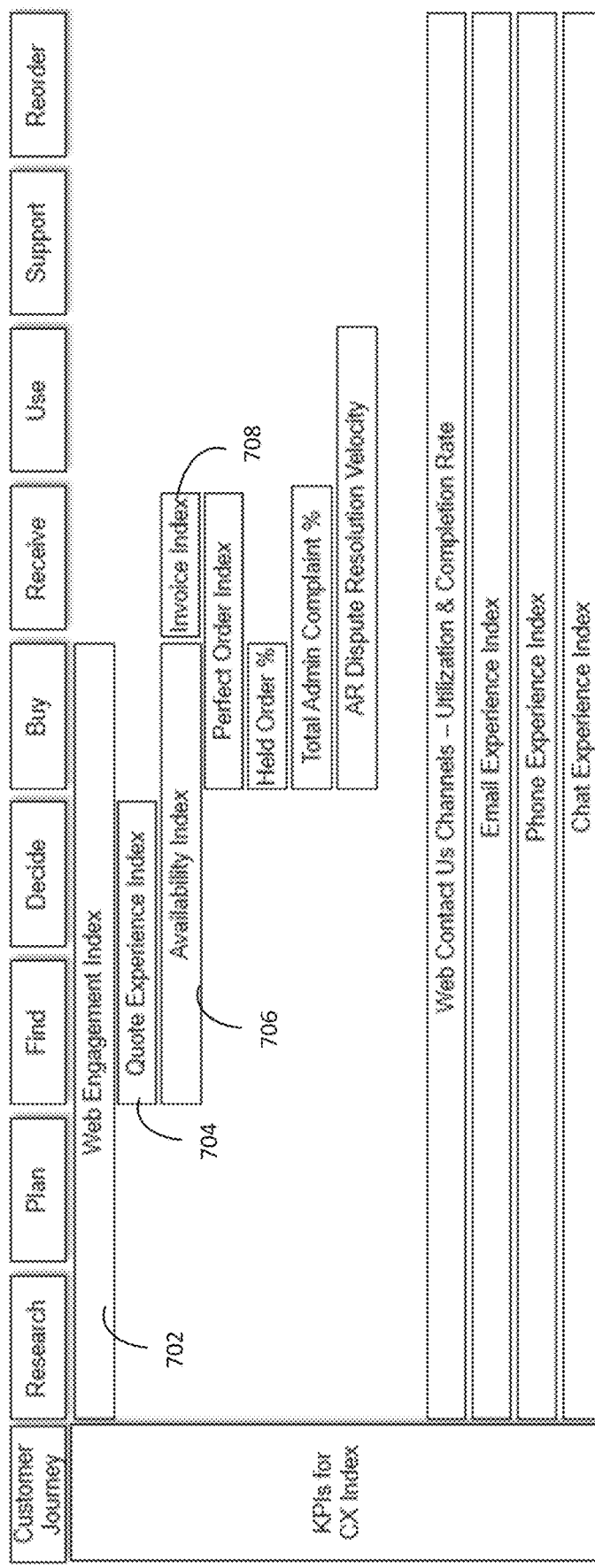
FIG. 7 shows example KPIs, according to some embodiments.

In some embodiments, data analytics module 404 identifies KPIs. The KPIs create an analytical basis for data analytics module 404 and other modules to make decisions about focus attenuation/areas and improving actions. For example, data analytics module 404 may identify one or more KPIs for each journey touchpoint based on the interaction data associated with each journey touchpoint. FIG. 7 shows example KPIs such as web engagement index 702, quote experience index 704, availability index 706, and invoice index 708, etc. Each KPI is across different customer journey touchpoints. For each touchpoint, there is a KPI reflecting the performance in that particular area. For example, customer 306 may conduct research by looking through specific emails and/or websites, seeking help from other users, surfing on the internet, etc., and the performance of such research may be represented by website engagement index 702. Based on the experience data and the KPIs, data analytics module 404 communicates with machine learning module 406 to generate the performance data. The performance data includes, but is not limited to, a KPI score, a CX index, a VOC index, and an experience score.

Figures 8A, 8B:
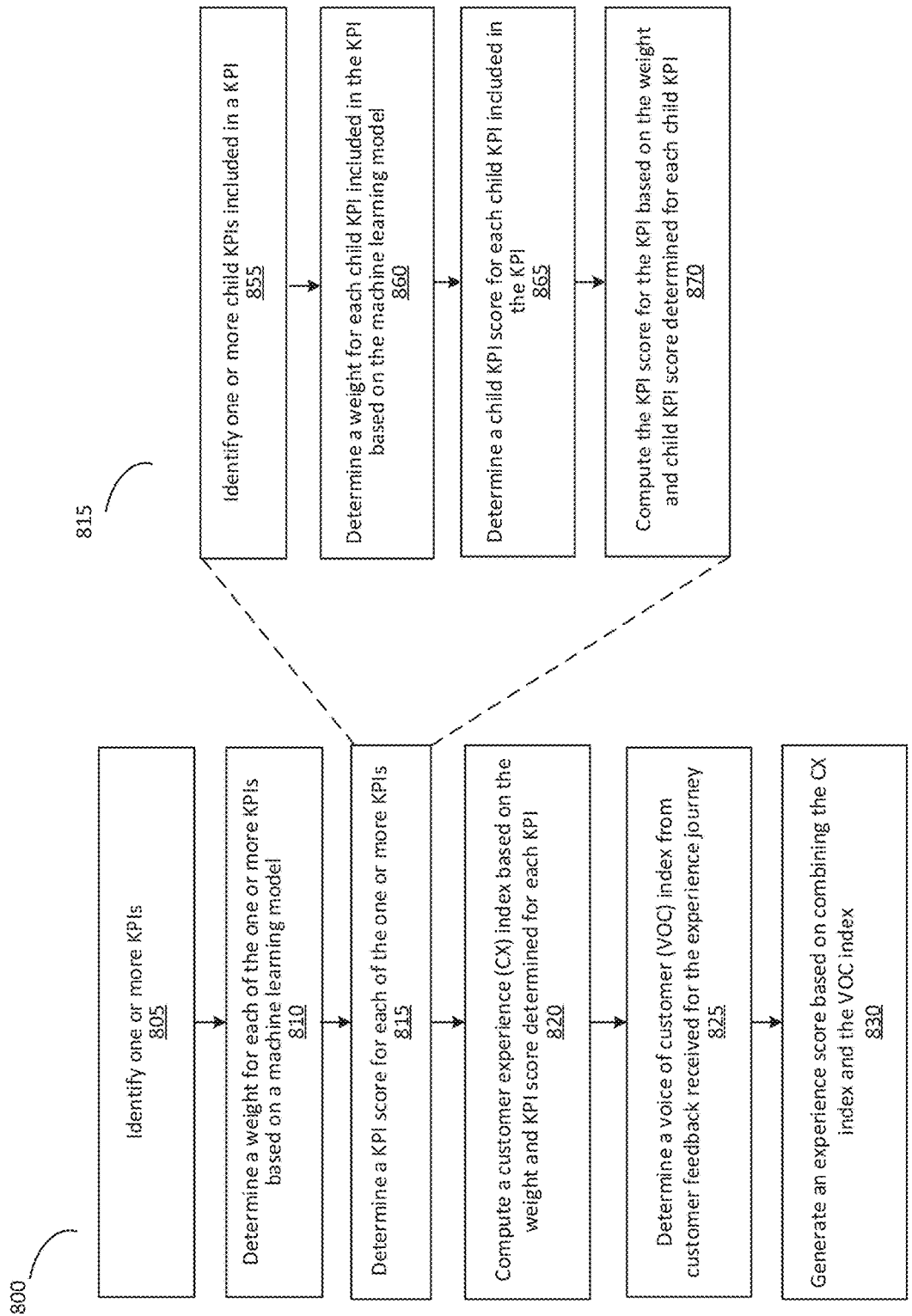
FIG. 8A is a flowchart of a method for generating performance data, according to some embodiments.
FIG. 8B is a flowchart of an operation for generating a KPI score for a KPI including child KPIs, according to some embodiments.

FIG. 8A is a flowchart of method 800 for generating performance data. At operation 805, data analytics module 404 identifies one or more KPIs from the interaction data associated with each journey touchpoint of an experience journey. At operation 810, data analytics module 404 communicates with machine learning module 406 to determine a weight for each of the one or more KPIs based on a machine learning model. Data analytics module 404 determines different weights for a KPI to reflect different importance levels of the KPI to different customers. Also, data analytics module 404 relies on a machine learning model that is built and trained by machine learning module 406 to adjust a weight for each KPI when the training of the machine learning model progresses. As such, the performance data generated based on the dynamic weights is more accurate and facilitates more the user experience improvement.

At operation 815, data analytics module 404 determines a KPI score for each of the one or more KPIs to measure performance in particular area(s) of the KPI. A KPI may cross different touchpoints of an experience journey and be determined based on various types of interaction data. Therefore, a KPI may include multiple child KPIs, where a child KPI may further nest other child KPIs, and so on. FIG. 8B shows the operation 815 of generating a KPI score for a KPI when the KPI (also referred to as "parent KPI") includes child KPIs. At operation 855, data analytics module 404 identifies one or more child KPIs included in the KPI. At operation 860, data analytics module 404 determines a weight for each child KPI included in the KPI based on the machine learning model. The weights for child KPIs are dynamically adjusted and optimized based on the training of the machine learning model. Data analytics module 404 then determines a child KPI score for each child KPI included in the KPI at operation 865, and computes the KPI score for the KPI based on the weight and child. KPI score determined for each child KPI at operation 870. In some embodiments, the KPI score for a KPI may be a weighted sum of child KPI scores for child KPIs.

Figure 9:
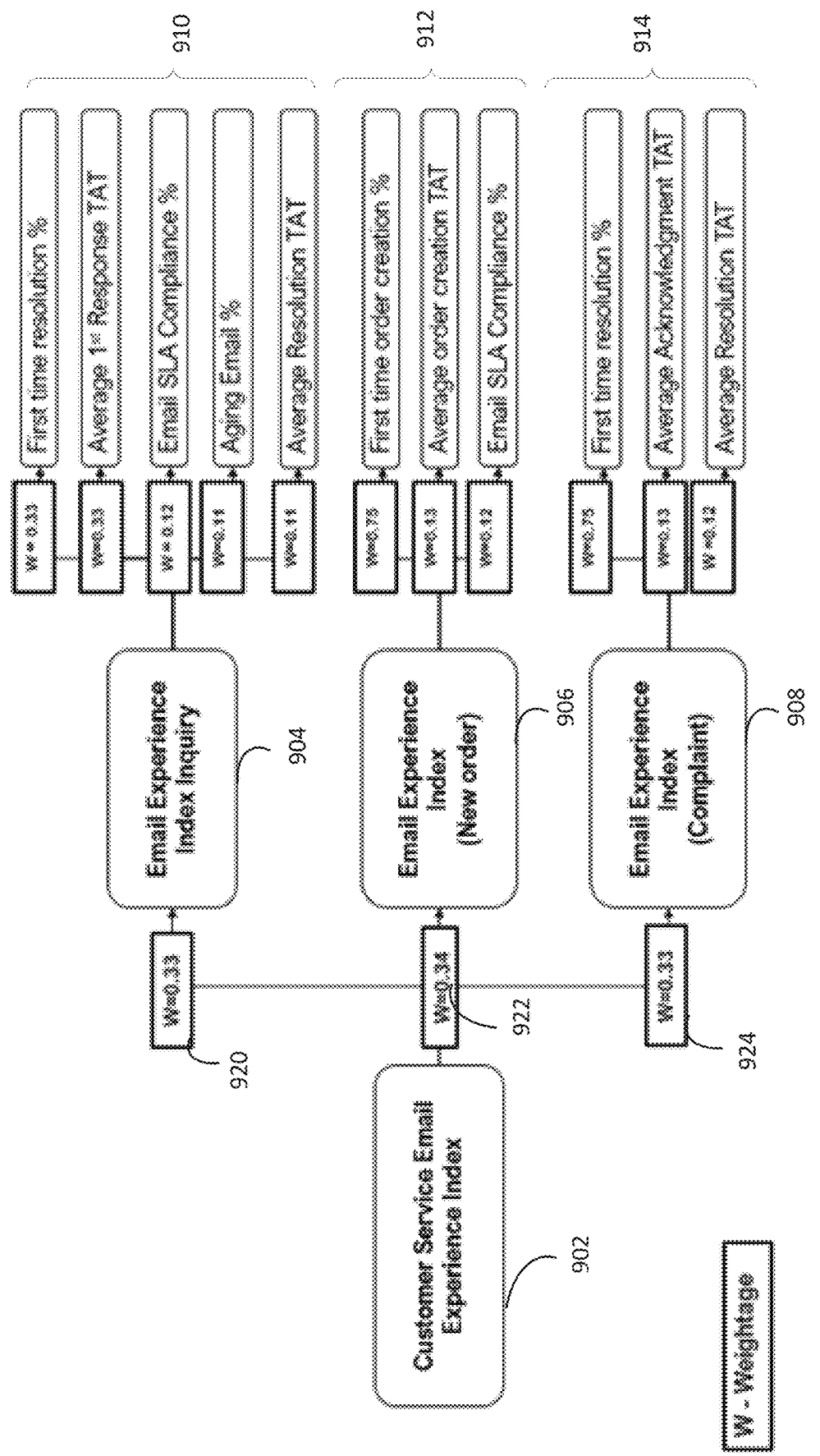
FIG. 9 is a procedure for generating a KPI score for a KPI, according to some embodiments.

An illustration for generating a KPI score for an example KPI, i.e., customer service email experience index 902, is shown in FIG. 9. Customer service email experience index 902 includes three child KPIs: email experience index inquiry 904, email experience index for new order 906, and email experience index for complaint 908. Each of child KPIs 904, 906, and 908 respectively includes multiple child KPIs in each group 910, 912, or 914. Data analytics module 404 communicates with machine learning module 406 to assign weights to each child KPI that makes up a parent KPI. For example, a one-third weight 920, 922, and 924 is evenly assigned to child KPIs 904, 906, and 908 to show the equal importance of these child KPIs in determining the KPI score for the parent customer service email experience index 902. In some embodiments, data analytics module 404 may compute a weighted sum of child KPI scores associated with child KPIs in group 910 as a KPI score for KPI 904. Similarly, data analytics module 404 may compute a KPI score for each of KPIs 906 and 908 respectively based on child KPIs in each of groups 912 and 914. Data analytics module 404 may then compute a weighted sum of the KPI scores for child KPIs 904, 906, and 908 as the KPI score for parent customer service email experience index 902. The weights assigned to each KPI/child KPI may be dynamically adjusted to increase the accuracy of the KPI score.

Referring back to FIG. 8A, once the weight and KPI scores are determined, at operation 820, data analytics module 404 computes a CX index. The CX index provides the objective measurement of the customer experience. Data analytics module 404 may compute a CX index based on every KPI associated with every touchpoint of an experience journey, to obtain an overall objective measurement of the customer experience. Data analytics module 404 may also compute a CX index based on selected KPIs to achieve knowledge about certain areas of the customer experience. In some embodiments, data analytics module 404 may compute the CX index as a weighted sum of the KPI scores as below:

$$CX\ Index = W1 \times KPI1 + W2 \times KPI2 + \ldots + Wn \times KPIn$$

Figure 10:
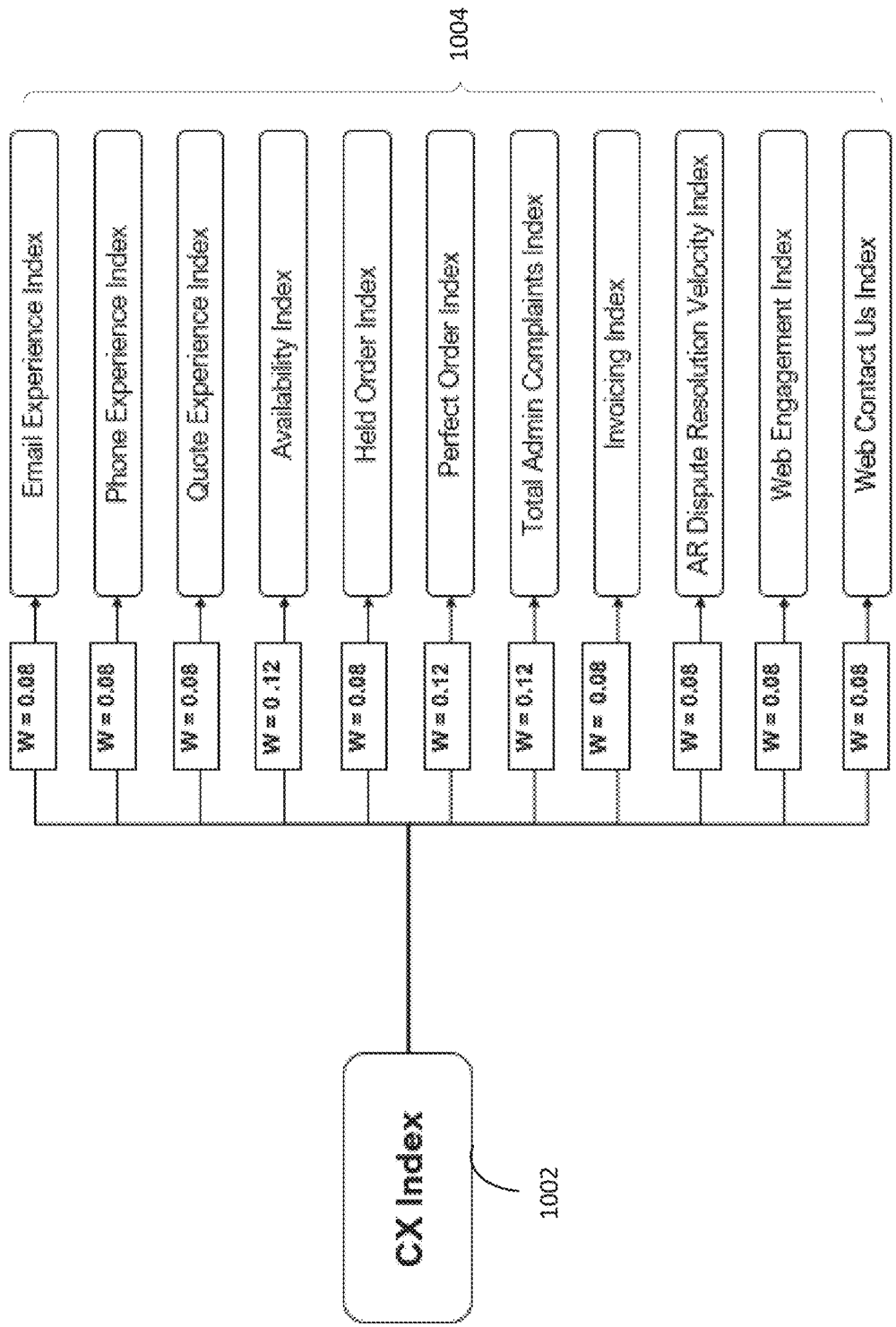
FIG. 10 shows an example CX index based on KPIs, according to some embodiments.

As shown in FIG. 10, CX index 1002 may be computed based on 11 KPIs in group 1004. Each KPIs of group 1004 is associated with a KPI score and a weight. For example, W1=0.08 is assigned to KPI1 of email experience index, W2=0.08 is assigned to KPI2 of phone experience index, and so on. Data analytics module 404 generates the weighted sum of 11 KPIs as CX index 1002.

In some embodiments, when computing a CX index using KPI scores, data analytics module 404 also normalizes the KPI scores. In the example of FIG. 11, a CX index 1114 is computed for five customers based on two KPIs: a perfect order index 1102 and an email experience index 1104. Using rule 1106, data analytics module 404 converts each KPI score of perfect order index 1102 in percentage term into a value within a first range. Using rule 1108, data analytics module 404 converts KPI scores of email experience index 1104 such that the converted KPI scores fit into a second range of values that are comparable to the first range of values. A converted KPI score is also referred to as an absolute score. Data analytics module 404 then computes CX index 1114 based on weights 1110 and 1112 and absolute scores. For example, the CX index score for customer 4 is 3×0.75+9×0.25=5. In some embodiments, rules 1106 and 1108 are predefined. In other embodiments, rules 1106 and 1108 may vary as the machine learning model continues to be trained. For example, in rule 1106, the score "3" is assigned when a perfect order index is less than 90%, This score "3" can be significantly decreased based on the training of the machine learning model to amplify the problems in perfect order processing and thus attract more attention to improve this area.

In referring to FIG. 8A, data analytics module 404 further determines a VOC index from the customer feedback received for the experience journey at operation 825, and generates an experience score based on combining the CX index and the VOC index at operation 830. The CX index provides the objective measurement of the customer experience. Similarly, the subjective measurement of the customer experience can be measured by the VOC index. The objective CX index measures the customer experience consistently without other factors that may alter the data gathered with this measurement, while the subjective VOC index may be subject to biases caused by sample size, customer selection or other factors. However, both measurements are key to evaluate the user experience associated with touchpoints of an experience journey. In some embodiments, data analytics module 404 brings together both the subjective measurement (e.g., survey-based voice of customer) and objective measurement of the customer experience (e.g., interaction data, KPIs), and build a consolidated score (e.g., an experience score) to obtain an overall assessment of the user experience of the experience journey. The experience score can be the weighted average of CX index and VOC index as below:

$$experience\ score = W1 \times CX\ index + W2 \times VOC\ Index$$

In some embodiments, data analytics module 404 stores the performance data including the KPI score, CX index, IOC index, and experience score in performance data library 454. Alternatively or additionally, data analytics module 404 may transmit the performance data to other modules/devices for further processing.

In some embodiments, the KPI scores, CX index, VOC index, and experience score may be organized in a visually distinct way to facilitate customer consumption. For example, user interface module 412 may communicate with other modules of server 320 to generate and transmit graphic data to mobile device 304 of customer 306 for displaying, on mobile device 304, graphical representations of experience measurements as shown in FIGS. 12A-12F. These figures may also be used by at least machine learning module 406 and recommendation module 408 to perform customer experience insight analysis.

Figure 12A:
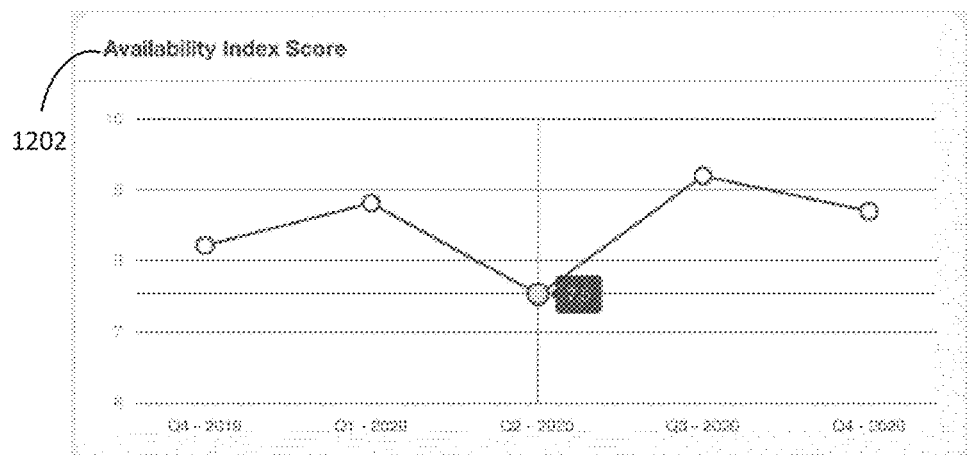
FIG. 12A is a primary graph of a KPI, according to some embodiments.

A CX index is computed based on a set of KPI scores. Each CX index has an associated primary graph where KPI scores of a KPI are trended over discrete time intervals. FIG. 12A is a primary graph of availability index scores 1202 trended over discrete time intervals of five quarters, Availability index scores 1202 are associated with an availability index. When availability index score 1202 in a current quarter is compared with the score in the same quarter of the previous year, seasonal anomaly may be visualized.

Figure 12B:
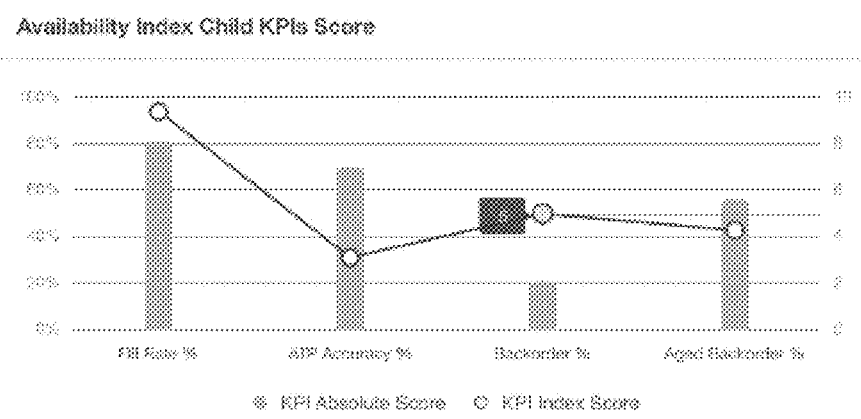
FIGS. 12B-12E are graphs of child KPIs of the KPI in FIG. 12A, according to some embodiments.
Figure 12C:
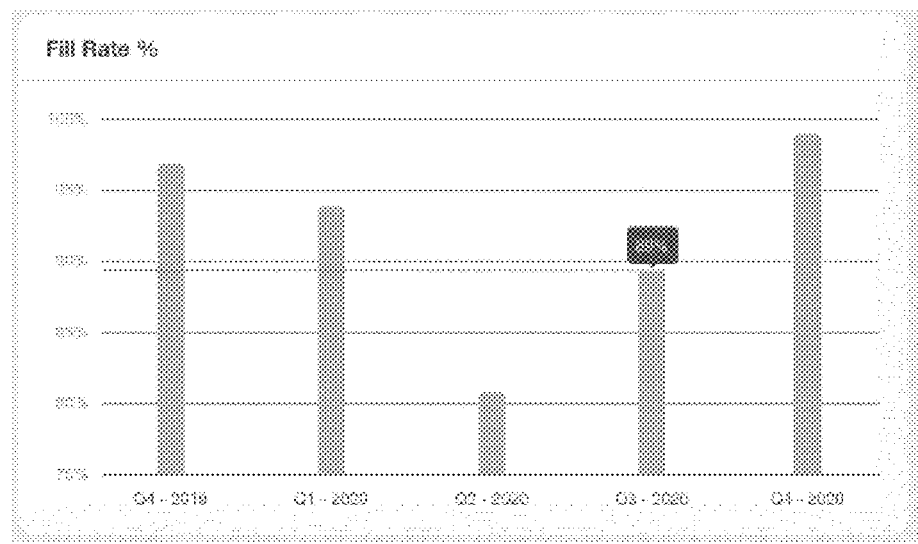
Figure 12D:
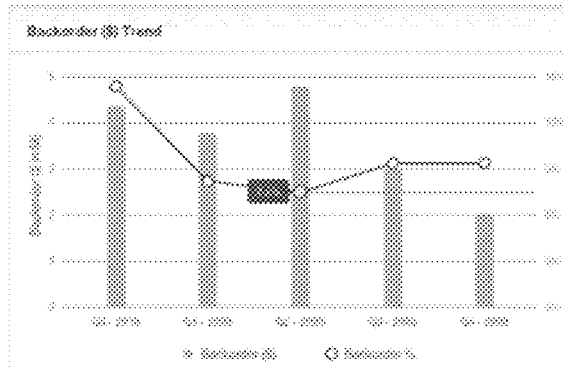
Figure 12E:
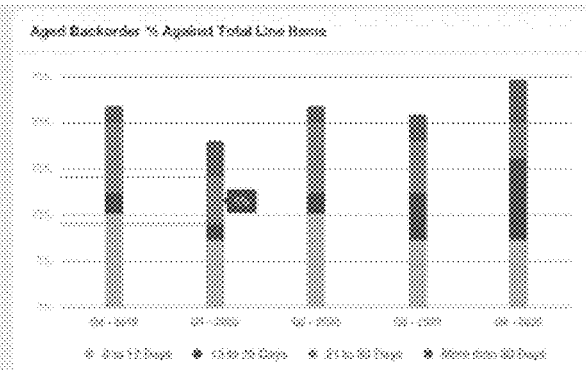

The child KPI scores may also be visualized. FIG. 12B is a graph of child KPIs of the availability index in FIG. 12A. The child KPIs include a fill rate percentage, an available to promise (ATP) accuracy percentage, a backorder percentage, and an aged backorder percentage. The child KPI scores of each child KPI are plotted over a current quarter. The primary graph in FIG. 12A may be further drilled down to gain more insights into the KPI performance. For example, the trend analysis may be performed on a child KPI such as the quarter analysis of the fill rate percentage shown in FIG. 12C. The detailed view in FIG. 12C may also highlight data points per business requirement and be related to primary KPIs and/or child KPIs. For example, the plots in FIGS. 12D and 12E may help a user understand the backorder trend and the aged backorder percentage against total line items.

Figure 12F:
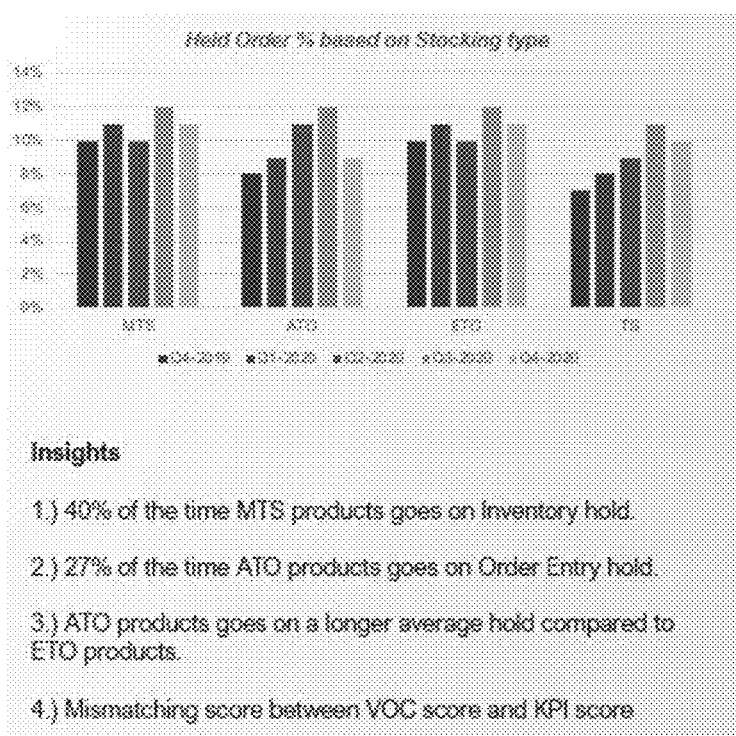
FIG. 12F highlights insights gained from KPI analysis, according to some embodiments.

The next step in the KPI drill down process is shown in FIG. 12F, which highlights insights gained from underlying data based on statistical modelling. The insights that spot bottlenecks or see significant successes can help determine the next steps based upon the actual experience of a customer. This will be described below in more detail with reference to FIGS. 13-16.

In some embodiments, user interface module 412 also works with other modules/devices to present the drilling down analysis of KPIs in different views. For example, the views may include a history view and an open transaction view. The user interface module 412 may display lagging KPIs in a history view while displaying leading KPIs in an open transaction view. A lagging KPI, e.g., an invoice accuracy percentage, relates to a transaction that has already been processed and closed. A leading KPI, e.g., an open backorder percentage, relates to a transaction that is incomplete. User interface module 412 may highlight different contents in different views to ensure that business users either take an action on open transactions to expedite the processing or to conduct an offline analysis for already-closed transactions.

In some embodiments, recommendation module 408 along with machine learning module 406 may analyze the performance data (e.g., based on drilling-down analysis as shown in FIGS. 12A-12F) and identify an action to be taken (e.g., next best action) for a customer. The action is identified to improve user experience as well as improving revenue, working capital and margin.

Figure 13:
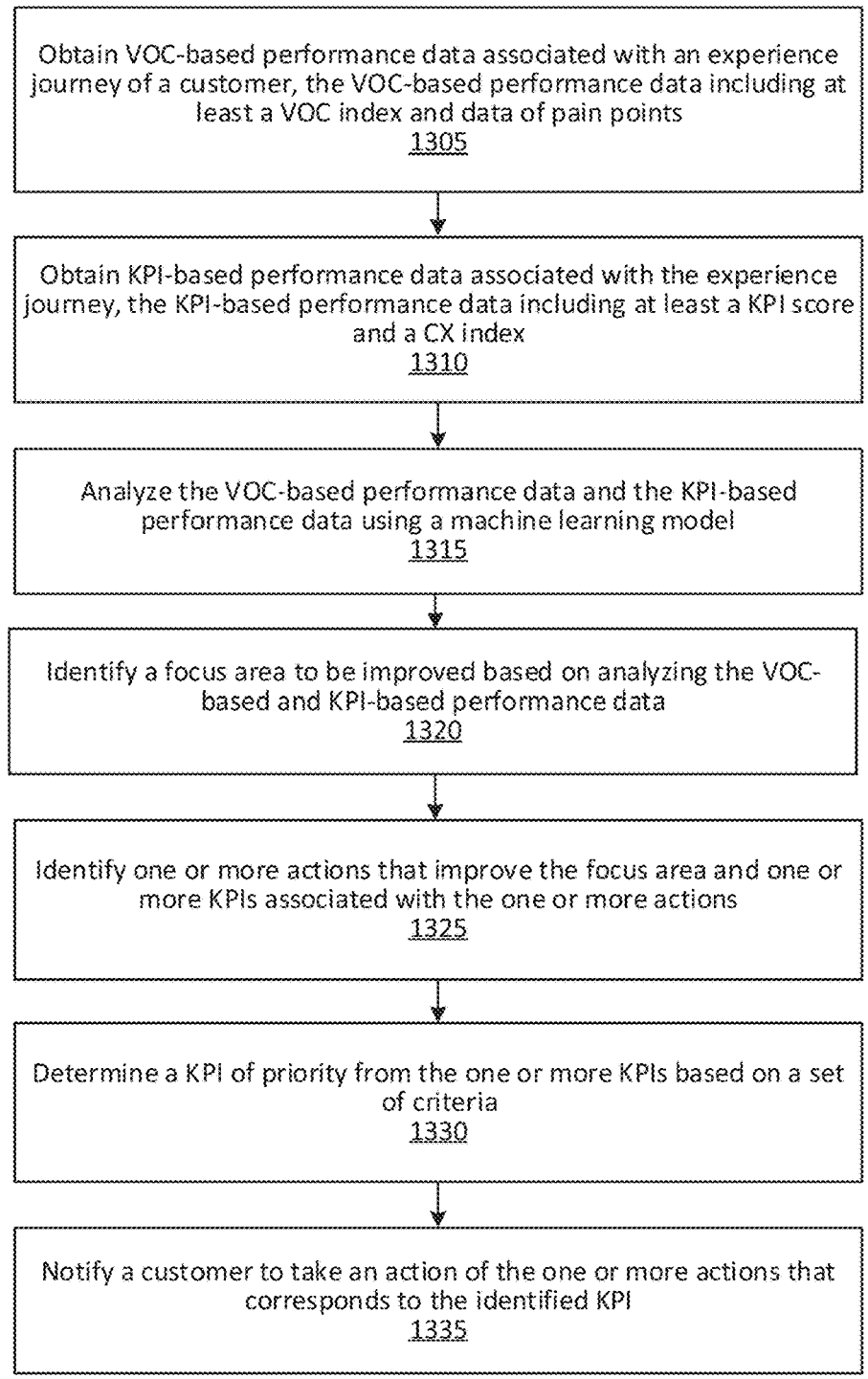
FIG. 13 is a flowchart of a method for identifying an action to be taken to improve a focus area, according to some embodiments.

FIG. 13 is a flowchart of method 1300 for identifying an action to be taken to improve a focus area. At operation 1305, recommendation module 408 obtains VOC-based performance data associated with an experience journey (e.g., journey 600 in FIG. 6) of a customer (e.g., customer 306 in FIG. 3), where the VOC-based performance data includes at least a VOC index and data of pain points. The VOC-based performance data represents subjective performance measurement for customer 306 in journey 600. At operation 1310, recommendation module 408 obtains KPI-based performance data associated with the experience journey, where the KPI-based performance data includes at least a KPI score and a CX index. The KPI-based performance data represents objective performance measurement for customer 306 in journey 600. In some embodiments, recommendation module 408 retrieves the performance data including the VOC-based performance data and KPI-based performance data from performance data library 454.

At operation 1315, recommendation module 408 analyzes the VOC-based performance data and the KPI-based performance data using a machine learning model. As described above, machine learning module 406 builds the machine learning model based on the experience data (e.g., customer feedback and interaction data) and KPIs associated with the experience journey. The machine learning model may be a regression model, SVM model, k-means clustering model, CNN model, etc.

At operation 1320, recommendation module 408 identifies a focus area to be improved based on analyzing the VOC-based and KPI-based performance data using the machine learning model. The focus area may include a feature presenting troublesome or an area needing further development. In some embodiments, recommendation module 408 may identify a focus area from pain points associated with the experience journey. For example, recommendation module 408 may analyze one or more attributes of pain points (e.g., weight, intensity) using the machine learning model and determine whether a pain point is important and frustrating. Recommendation module 408 may determine to prioritize and focus on a pain point that is both important and frustrating, to reduce the customer frustration. In other embodiments, recommendation module 408 may identify a focus area from particular areas related to KPI-based performance data. For example, recommendation module 408 may determine to focus on email communication across touchpoints of the experience journey because an email experience index score is low (e.g., below a threshold).

At operation 1325, recommendation module 408 identifies one or more actions that improve the focus area and one or more KPIs associated with the one or more actions. For example, to improve email communication, recommendation module 408 may identify actions such as adding support for handling new order entries, reducing errors of new order processing, expediting complaint processing, etc. As shown in FIG. 9, an email experience index 902 includes multiple child KPIs of email experience index inquiry 904, email experience index for new order 906, and email experience index for complaint 908. Each action identified by recommendation module 408 can correspond to one or more of KPIs 904, 906, and 908. Recommendation module 408 needs to find the cause for unsatisfied email communication and identify a target action from the one or more actions to address the concern.

At operation 1330, recommendation module 408 determines a KPI of priority from the one or more KPIs based on a set of criteria. At operation 1335, recommendation module 408 notifies a customer to take an action of the one or more actions that correspond to the identified KPI. Continuing with the above example, recommendation module 408 may prioritize email experience index inquiry 904 from KPIs 904, 906, and 908, and notify the customer to take the action corresponding to the prioritized KPI 904, e.g., automating the email processing regarding inquires. In some embodiments, recommendation module 408 may communicate with user interface module 412 to generate and display a notification of the action on a mobile device (e.g., mobile device 304) associated with the customer (e.g., customer 306). In some embodiments, recommendation module 408 also stores the one or more actions, the target action and other data relevant to determining the target action in recommendation library 456.

In some embodiments, recommendation module 408 may determine the KPI of priority from the one or more KPIs based on comparison of the KPIs against one or more predefined thresholds. For example, recommendation module 408 may determine if (1) a backorder percentage is above a first threshold, (2) if an aged backorder percentage is above a second threshold, (3) if a backorder value is above a third threshold, or (4) if at least one of a backorder percentage or aged backorder percentage has increased significantly (e.g., above a fourth threshold) compared to the previous quarter. When one of (1) to (4) is satisfied, recommendation module 408 determines that KPI in the satisfied criterion is of priority and identifies a corresponding action, e.g., improving product availability, as a next best action or target action for recommending to a customer.

In some embodiments, the comparison of the KPIs against the one or more predefined thresholds does not result in a KPI of priority, e.g., none of (1) to (4) is met, recommendation module 408 may compare the KPIs of the current customer to other similar customers in order to determine the KPI of priority. For example, five customers that have best performance on the KPI of backorder percentage are identified. Although the backorder percentage of the current customer is below a first threshold, it is significantly higher than the backorder percentages of the five customers. As a result, recommendation module 408 may prioritize the backorder percentage and communicate with user interface module 412 to notify the current customer to take an action that corresponds to the backorder percentage. The identification of similar customers will be described in more detail with reference to FIGS. 15 and 16.

Responsive to identifying the action, in some embodiments, recommendation module 408 may integrate with other systems to ensure that the action can be timely taken. For example, the recommended action may be integrated with a system of record such as enterprise resource planning (ERP) application at the transactional level for an order processor to take real time action based on the recommended action. With respect to the aforementioned automating the email processing regarding inquires, the emails may be automatically converted and input to the ERP system to reduce a time lag between an email being sent by a user and an index being created by the system, thereby reducing the overall processing time and improving email communication.

Figure 14:
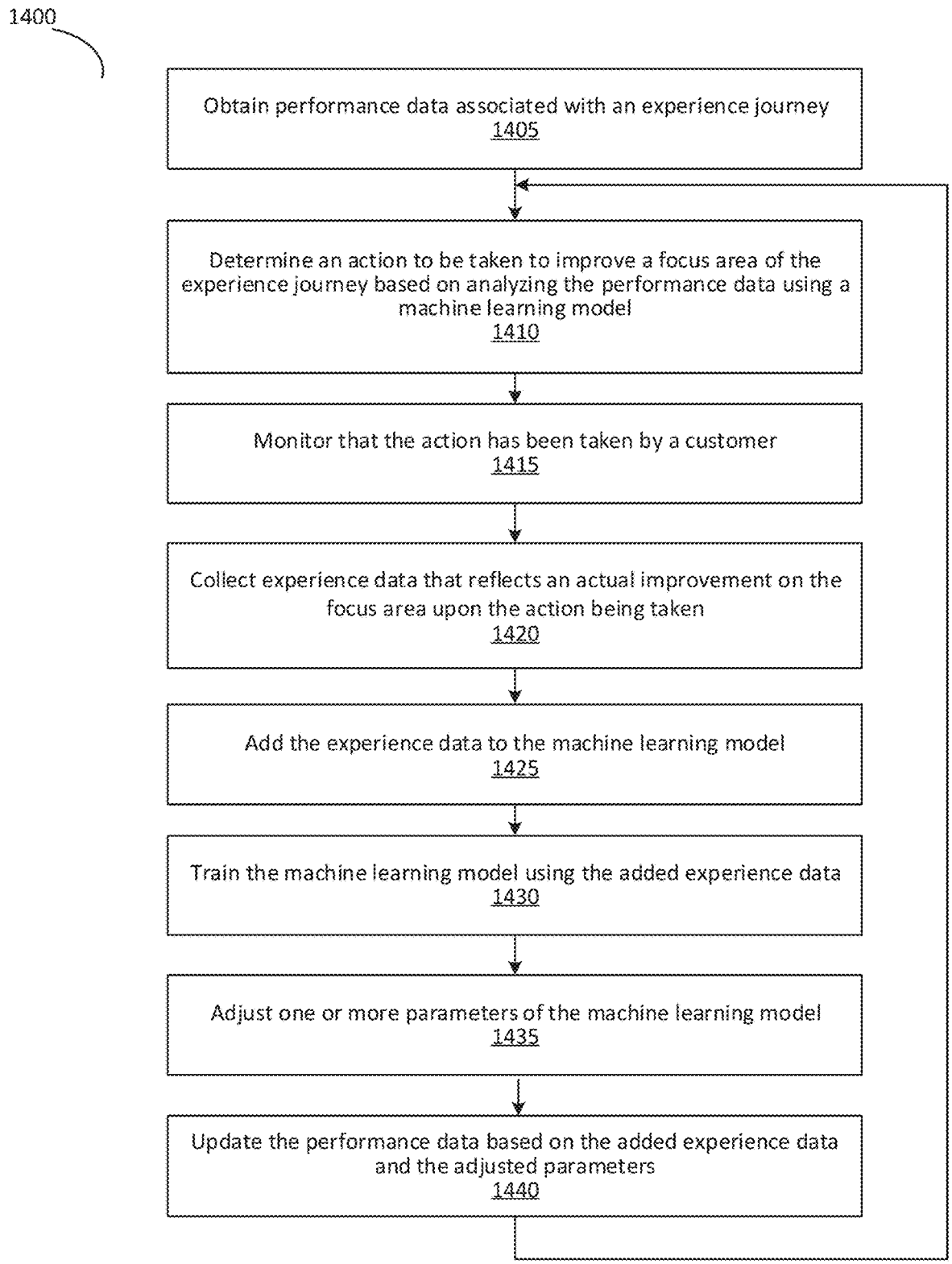
FIG. 14 is a flowchart of a method for training a machine learning model, according to some embodiments.

The action recommended to improve a focus area is dynamic. In some embodiments, recommendation module 408 communicates with machine learning module 406 to train the machine learning model based on an actual improvement from the implementation of the action and in turn adjust the action to be taken to make further improvement. FIG. 14 is a flowchart of method 1400 for training the machine learning model. At operation 1405, recommendation module 408 obtains performance data associated with an experience journey. At operation 1410, recommendation module 408 determines an action to be taken to improve a focus area of the experience journey based on analyzing the performance data using a machine learning model, as shown in FIG. 13.

Once recommendation module 408 notifies a customer of the action, machine learning module 406 starts to detect whether the action has been taken by the customer. At operation 1415, machine learning module 406 monitors that the action has been taken by the customer. For example, machine learning module 406 may receive a signal from data aggregation module 402 indicating that the action has been taken.

At operation 1420, machine learning module 406 collects experience data that reflects an actual improvement on the focus area (e.g., via data aggregation module 402) upon the action having been taken. At operation 1425, machine learning module 406 adds the experience data to the machine learning model to start a new cycle of model training. At operation 1430, machine learning module 406 trains the machine learning model using the newly added experience data. At operation 1435, machine learning module 406 adjusts one or more parameters of the machine learning model. For example, machine learning module 406 may generate an expected increase based on simulating the increase from the implementation of the action. When the new experience data reflecting the actual improvement is received, machine learning module 406 compares the expected increase and the actual improvement to adjust the one or more parameters, such as one or more weights assigned to KPIs. The adjustment of the model in turn affects the computation of performance data based on the model. Therefore, at operation 1440, data analytics module 404 communicates with machine learning module 406 to update the performance data based on the added experience data and the adjusted parameters. The updated performance data can be looped back to recommendation module 408 for determining and/or adjusting the action to be taken to help advancement of a focus area. In this way, a continuous data-insight-action loop is established to improve customer experience.

While the disclosure described herein mainly focuses on customer experience that is external to an organization or business entity, this description is also applied to other fields such as sales experience that is internal to a business entity. A different experience journey with different touchpoints based on a different set of data may be analyzed, evaluated, summarized and used to provide recommendations to improve sales experience using a same methodology and framework, Customer Segmentation Customer segmentation divides customers of a business entity into groups. Each group contains similar customers that share certain similarities. For example, a customer X has certain requirements, e.g., only receiving products after 6 am. The business entity serving X will need certain accommodation in processing to meet this requirement, which increases the complexity of processing and operational risk. However, if other customers that also require such non-standard processing can be found, a balance between total value (e.g., bandwidth, profit) and cost on complexity and risk may be achieved. Segment module 410 in FIG. 4 is able to decide how to group customers in a segment to maximize the value of each customer to the business. In some embodiments, segment module 410 performs customer segmentation based on complexity assessment and risk assessment. Complexity assessment is a metric-driven analysis to establish complexity of customer segments and facilitate analytical insights to customize the services offered to customer segments. Risk assessment helps identify the operational and business-specific risk for customer segments.

Figure 15:
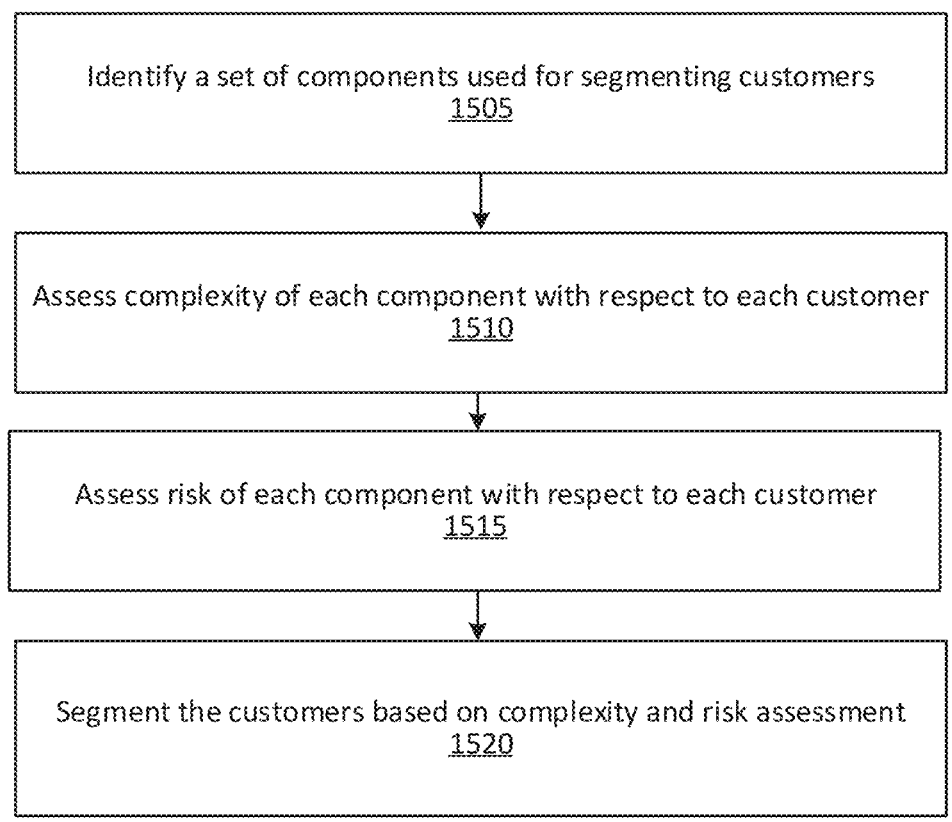
FIG. 15 is a flowchart of a method for customer segmentation, according to some embodiments.

FIG. 15 is a flowchart of method 1500 for customer segmentation. At operation 1505, segmentation module 410 identifies a set of components used for segmenting customers. The components can be segmentation measurements or factors that help differentiate segments. For example, the components may relate to financial information of a customer, risk assessment for the customer, the customer's reputation, etc.

At operation 1510, segmentation module 410 assesses complexity of each component with respect to each customer. For example, segmentation module 410 may determine an outsource segment for customers that can be outsourced in department or process of communication, customer experience management, and marketing planning. Segmentation module 410 assesses the complexity of each process, for example, assesses whether a process is a high-hierarchical process, which process is group-oriented, whether the process is a standard process or an exceptional process, etc. In some embodiments, the complexity may also be measured by KPI-based scores, where these scores may be similarly generated as shown in FIGS. 8-11. At operation 1515, segmentation module 410 assesses risk of each component with respect to each customer, for example, the cost to outsource a particular customer, the potential reduction of revenue, etc. At operation 1520, segmentation module 410 segments the customers based on the complexity assessment and the risk assessment.

Figure 16:
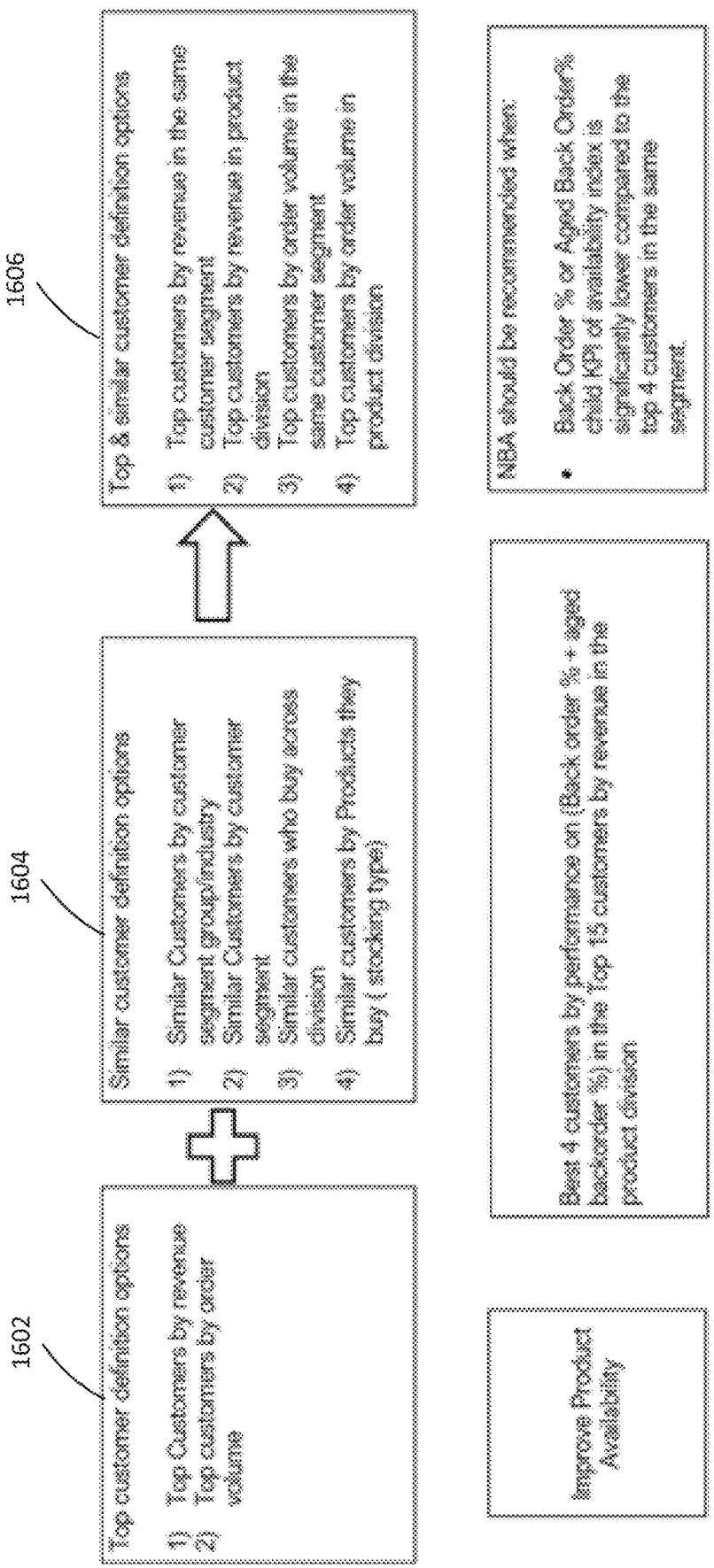
FIG. 16 is a process for identifying top and similar customers, according to some embodiments.

FIG. 16 is a process for identifying top and similar customers. Top customers are identified, for example, based on one or more KPI scores, CX scores and experience scores related to revenue and order volume, in 1602. Similar customers that are divided into different segments are also identified in 1604. Based on the customers identified in 1602 and 1604, top and similar customers, such as top customers by revenue in the same customer segment, are identified in 1606. The identification of top and similar customers helps determine an action to take to improve user experience as shown in FIG. 13.

ADDITIONAL CONSIDERATIONS

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component.

Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated and described with the figures above. Modules may constitute either software modules (e.g., code embodied on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may include dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processors) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured by software) or permanently configured to perform the relevant operations. Whether temporarily or permanently configured, such processors may constitute processor-implemented modules that operate to perform one or more operations or functions. The modules referred to herein may, in some example embodiments, include processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The terns "coupled," however, may also mean that two or more elements are not in direct contact with each other, yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that includes a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" is employed to describe elements and components of the embodiments herein. This is done merely for convenience and to give a general sense of the claimed invention. This description should be read to include one or at least one and the singular also includes the plural unless it is obvious that it is meant otherwise.

Upon reading this disclosure, those of skill in the art will appreciate still additional alternative structural and functional designs for the system described above. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for automatically detecting and evaluating experience data associated with an experience journey to identify and adjust an action that is taken to improve customer experience, the method comprising:
    collecting data associated with the experience journey from a plurality of network and computer sources via hardware hubs based on user authentication;
    processing the collected data to prepare experience data used to train a machine learning model, the experience data including customer feedback and objective interaction data;
    training the machine learning model using the experience data;
    generating a plurality of performance data associated with the experience journey using the trained machine learning model;
    identifying individual performance data from the plurality of performance data when the individual performance data has changed over an individual threshold in a time period;
    determining an action for solving a network issue associated with the identified performance data based on analyzing hierarchies of the experience data;
    performing the action to solve the network issue, wherein performing the action comprises automatically converting one or more emails and inputting the converted emails into an external computing system to reduce a time lag between an email being sent by a user and an index automatically being created by the external computing system;
    accessing respective sources of the plurality of network and computer sources based on respective user roles to automatically detect and collect new experience data from the plurality of network and computer sources that reflect improvement on solving the network issue responsive to the action having been taken;
    adding the new experience data to retrain and adjust the machine learning model;
    updating the plurality of performance data and a next action based on retraining the machine learning model; and
    causing a first user interface to be generated on a user device to display a graph of a first hierarchical metric of the plurality of performance data, wherein the first user interface is configured to display a limited set of data points that can be reached directly from the graph, and each of the data points can be selected to launch a second user interface including one or more second hierarchical metrics of the plurality of performance data for drilling down analysis.

2. The method of claim 1, wherein to generate the plurality of performance data, the method further comprises:
    receiving, from a customer, the customer feedback associated with the experience journey;
    automatically collecting the objective interaction data associated with each touchpoint of the experience journey;
    identifying a plurality of key performance indicators (KPIs) based on the objective interaction data; and
    generating, based on the machine learning model, the plurality of performance data associated with the experience journey from the experience data and the plurality of KPIs,
    wherein training the machine learning model is based on the customer feedback, the objective interaction data, and the plurality of KPIs.

3. The method of claim 2, further comprising:
    responsive to training the machine learning model, adjusting one or more parameters of the machine learning model, the one or more parameters including one or more weights assigned to the plurality of KPIs; and
    wherein updating the plurality of performance data and the next action is based on the adjusted parameters.

4. The method of claim 1, wherein the plurality of performance data includes at least one of a KPI score, a customer experience (CX) index, a voice of customer (VOC) index, and an experience score.

5. The method of claim 4, wherein to generate the plurality of performance data, the method further comprises:
    identifying one or more KPIs associated with each touchpoint of the experience journey based on the objective interaction data;
    determining a weight for each of the one or more KPIs based on the machine learning model;
    determining the KPI score for each of the one or more KPIs;
    computing the CX index based on the weight and KPI score determined for each KPI;
    determining the VOC index from the customer feedback; and
    generating the experience score based on combining the CX index and the VOC index.

6. The method of claim 5, wherein to determine the KPI score, the method further comprises:
    identifying one or more child KPIs included in a KPI;
    determining a weight for each child KPI included in the KPI based on the machine learning model;
    determining a child KPI score for each child KPI included in the KPI; and
    computing the KPI score for the KPI based on the weight and child KPI score determined for each child KPI.

7. The method of claim 1, wherein to determine the action for solving the network issue, the method further comprises:
    identifying a focus area to be improved based on analyzing the plurality of performance data;
    identifying one or more actions that improve the focus area and one or more KPIs associated with the one or more actions;
    determining a KPI of priority from the one or more KPIs based on a set of criteria; and
    identifying, from the one or more actions, the action that corresponds to the identified KPI.

8. The method of claim 7, further comprising:
    notifying a customer to take the identified action; and
    monitoring a progress that the customer takes the identified action.

9. The method of claim 1, further comprising:
identifying a set of components used for segmenting customers;
assessing complexity of each component with respect to each customer;
assessing risk of each component with respect to each customer; and
segmenting the customers based on complexity and risk assessment.

10. A system for automatically detecting and evaluating experience data associated with an experience journey to identify and adjust an action that is taken to improve customer experience, the system comprising:
a server comprising:
a customer experience management application; and
data storage units communicatively coupled to the customer experience management application;
a network communicatively coupled to the server;
a software application running on an electronic device communicatively coupled via the network to the server; and
wherein the customer experience management application is configured to:
collect data associated with the experience journey from a plurality of network and computer sources via hardware hubs based on user authentication;
process the collected data to prepare experience data used to train a machine learning model, the experience data including customer feedback and objective interaction data;
train the machine learning model using the experience data;
generate a plurality of performance data associated with the experience journey using the trained machine learning model;
identify individual performance data from the plurality of performance data when the individual performance data has changed over an individual threshold in a time period;
determine an action for solving a network issue associated with the identified performance data based on analyzing hierarchies of the experience data;
perform the action to solve the network issue, wherein performing the action comprises automatically converting one or more emails and inputting the converted emails into an external computing system to reduce a time lag between an email being sent by a user and an index automatically being created by the external computing system;
access respective sources of the plurality of network and computer sources based on respective user roles to automatically detect and collect new experience data from the plurality of network and computer sources that reflect improvement on solving the network issue responsive to the action having been taken;
add the new experience data to retrain and adjust the machine learning model;
update the plurality of performance data and a next action based on retraining the machine learning model; and
cause a first user interface to be generated on a user device to display a graph of a first hierarchical metric of the plurality of performance data, wherein the first user interface is configured to display a limited set of data points that can be reached directly from the graph, and each of the data points can be selected to launch a second user interface including one or more second hierarchical metrics of the plurality of performance data for drilling down analysis.

11. The system of claim 10, wherein to generate the plurality of performance data, the customer experience management application is further configured to:
receive, from a customer, the customer feedback associated with the experience journey;
automatically collect the objective interaction data associated with each touchpoint of the experience journey;
identify a plurality of key performance indicators (KPIs) based on the objective interaction data; and
generate, based on the machine learning model, the performance data associated with the experience journey from the experience data and the plurality of KPIs,
wherein training the machine learning model is based on the customer feedback, the objective interaction data, and the plurality of KPIs.

12. The system of claim 11, wherein the customer experience management application is further configured to:
responsive to training the machine learning model, adjust one or more parameters of the machine learning model, the one or more parameters including one or more weights assigned to the plurality of KPIs; and
wherein updating the plurality of performance data and the next action is based on the adjusted parameters.

13. The system of claim 10, wherein the plurality of performance data includes at least one of a KPI score, a customer experience (CX) index, a voice of customer (VOC) index, and an experience score.

14. The system of claim 13, wherein to generate the plurality of performance data, the customer experience management application is further configured to:
identify one or more KPIs associated with each touchpoint of the experience journey based on the objective interaction data;
determine a weight for each of the one or more KPIs based on the machine learning model;
determine the KPI score for each of the one or more KPIs;
compute the CX index based on the weight and KPI score determined for each KPI;
determine the VOC index from the customer feedback; and
generate the experience score based on combining the CX index and the VOC index.

15. The system of claim 14, wherein to determine the KPI score, the customer experience management application is further configured to:
identify one or more child KPIs included in a KPI;
determine a weight for each child KPI included in the KPI based on the machine learning model;
determine a child KPI score for each child KPI included in the KPI; and
compute the KPI score for the KPI based on the weight and child KPI score determined for each child KPI.

16. The system of claim 10, wherein to determine the action for solving the network issue, the customer experience management application is further configured to:
identify a focus area to be improved based on analyzing the plurality of performance data;
identify one or more actions that improve the focus area and one or more KPIs associated with the one or more actions;
determine a KPI of priority from the one or more KPIs based on a set of criteria; and
identify, from the one or more actions, the action that corresponds to the identified KPI.

17. The system of claim 10, wherein the customer experience management application is further configured to:
- identify a set of components used for segmenting customers;
- assess complexity of each component with respect to each customer;
- assess risk of each component with respect to each customer; and
- segment the customers based on complexity and risk assessment.

18. A computer program product for automatically detecting and evaluating experience data to identify and adjust an action that is taken to improve customer experience, the computer program product comprising a non-transitory computer-readable medium having computer readable program code stored thereon, the computer readable program code configured to:
- collect data associated with the experience journey from a plurality of network and computer sources via hardware hubs based on user authentication;
- process the collected data to prepare experience data used to train a machine learning model, the experience data including customer feedback and objective interaction data;
- train the machine learning model using the experience data;
- generate a plurality of performance data associated with the experience journey using the trained machine learning model;
- identify individual performance data from the plurality of performance data when the individual performance data has changed over an individual threshold in a time period;
- determine an action for solving a network issue associated with the identified performance data based on analyzing hierarchies of the experience data;
- perform the action to solve the network issue, wherein performing the action comprises automatically converting one or more emails and inputting the converted emails into an external computing system to reduce a time lag between an email being sent by a user and an index automatically being created by the external computing system;
- access respective sources of the plurality of network and computer sources based on respective user roles to automatically detect and collect new experience data from the plurality of network and computer sources that reflect improvement on solving the network issue responsive to the action having been taken;
- add the new experience data to retrain and adjust the machine learning model;
- update the plurality of performance data and a next action based on retraining the machine learning model; and
- cause a first user interface to be generated on a user device to display a graph of a first hierarchical metric of the plurality of performance data, wherein the first user interface is configured to display a limited set of data points that can be reached directly from the graph, and each of the data points can be selected to launch a second user interface including one or more second hierarchical metrics of the plurality of performance data for drilling down analysis.

19. The computer program product of claim 18, wherein to generate the plurality of performance data, the computer readable program code is further configured to:
- receive, from a customer, the customer feedback associated with the experience journey;
- automatically collect the objective interaction data associated with each touchpoint of the experience journey;
- identify a plurality of key performance indicators (KPIs) based on the objective interaction data; and
- generate, based on the machine learning model, the plurality of performance data associated with the experience journey from the experience data and the plurality of KPIs,
- wherein training the machine learning model is based on the customer feedback, the objective interaction data, and the plurality of KPIs.

20. The computer program product of claim 19, wherein the computer readable program code is further configured to:
- responsive to training the machine learning model, adjust one or more parameters of the machine learning model, the one or more parameters including one or more weights assigned to the plurality of KPIs; and
- wherein updating the performance data and the next action is based on the adjusted parameters.

* * * * *